(12) United States Patent
Hatcher et al.

(10) Patent No.: US 9,077,099 B1
(45) Date of Patent: Jul. 7, 2015

(54) HARSH ENVIRONMENT CONNECTOR WITH ROTATING END SEAL ASSEMBLY

(71) Applicant: Teledyne Instruments, Inc., Thousand Oaks, CA (US)

(72) Inventors: Jonathan Richard Hatcher, South Daytona, FL (US); Nicholas Ethridge Hill, Edgewater, FL (US); Alan David McCleary, St. Augustine, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/197,794

(22) Filed: Mar. 5, 2014

(51) Int. Cl.
  *H01R 13/44* (2006.01)
  *H01R 13/52* (2006.01)
(52) U.S. Cl.
  CPC ........ *H01R 13/5213* (2013.01); *H01R 13/5219* (2013.01)
(58) Field of Classification Search
  CPC ... H01R 13/523; G02B 6/3816; G02B 6/3817
  USPC .......................................... 439/138, 139, 201
  See application file for complete search history.

(56) References Cited

U.S. PATENT DOCUMENTS

| 3,982,804 | A | 9/1976 | Marechal |
| 4,203,640 | A | 5/1980 | Bice et al. |
| 4,339,165 | A | 7/1982 | Malsot et al. |
| 4,606,603 | A | 8/1986 | Cairns |
| 4,616,900 | A | 10/1986 | Cairns |
| 4,666,242 | A | 5/1987 | Cairns |
| 4,673,242 | A | 6/1987 | Logan et al. |
| 4,682,848 | A | 7/1987 | Cairns |
| 4,753,611 | A | 6/1988 | Kobler |
| 4,773,725 | A | 9/1988 | Ashman et al. |
| 4,795,359 | A | 1/1989 | Alcock et al. |
| 4,865,563 | A | 9/1989 | Ney et al. |
| 4,878,731 | A | 11/1989 | Caron et al. |

(Continued)

FOREIGN PATENT DOCUMENTS

| CH | 680312 A5 | 7/1992 |
| DE | 615452 C | 7/1935 |

(Continued)

OTHER PUBLICATIONS

International Search Report and Written Opinion of the International Searching Authority for PCT/US2015/013561, issued by European Patent Office, mailed on May 6, 2015 in 11 pages.

*Primary Examiner* — Tho D Ta
(74) *Attorney, Agent, or Firm* — Procopio Cory Hargreaves & Savitch LLP

(57) ABSTRACT

A harsh environment connector has first and second connector units which each have at least one contact chamber in which at least one contact is located. Seal assemblies at the front ends of the respective contact chambers include seal members which rotate about the longitudinal axis of the connector as the units are mated to allow contacts of one connector unit to pass through aligned seal openings and into engagement with contacts in the other connector unit. Each seal assembly has a seal clamp member and the seal and seal clamp members are relatively rotatable during mating and de-mating between a first position when the units are unmated in which the seal openings are clamped shut by the seal clamp member and a second position when the units are mated in which clamp portions of the seal clamp member are offset from the seal openings.

39 Claims, 17 Drawing Sheets

(56) References Cited

U.S. PATENT DOCUMENTS

| | | |
|---|---|---|
| 4,929,184 A | 5/1990 | Emadi et al. |
| 4,948,377 A | 8/1990 | Cairns |
| 5,171,158 A | 12/1992 | Cairns |
| 5,194,012 A | 3/1993 | Cairns |
| 5,217,391 A | 6/1993 | Fisher, Jr. |
| 5,234,350 A | 8/1993 | Marechal et al. |
| 5,645,438 A | 7/1997 | Cairns |
| 5,685,727 A | 11/1997 | Cairns |
| 5,738,535 A | 4/1998 | Cairns |
| 6,017,227 A | 1/2000 | Cairns et al. |
| 6,315,461 B1 | 11/2001 | Cairns |
| 6,332,787 B1 | 12/2001 | Barlow et al. |
| 6,736,545 B2 * | 5/2004 | Cairns et al. .............. 385/56 |
| 2011/0129187 A1 * | 6/2011 | Toth .............................. 385/70 |
| 2014/0270645 A1 | 9/2014 | Toth |

FOREIGN PATENT DOCUMENTS

| | | |
|---|---|---|
| EP | 0141746 A2 | 5/1985 |
| EP | 0538089 A1 | 4/1993 |
| GB | 2166261 A | 4/1986 |
| JP | 2004-246096 A | 9/2004 |
| SU | 1356080 A1 | 11/1987 |

\* cited by examiner

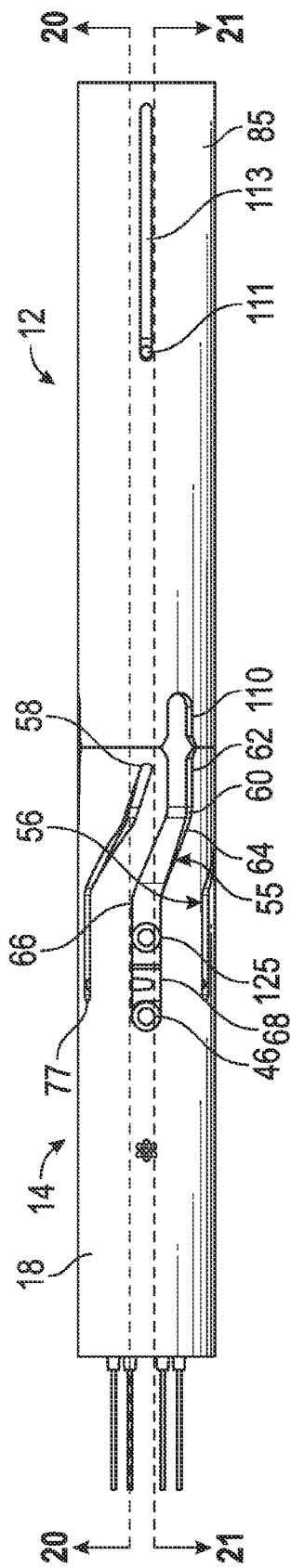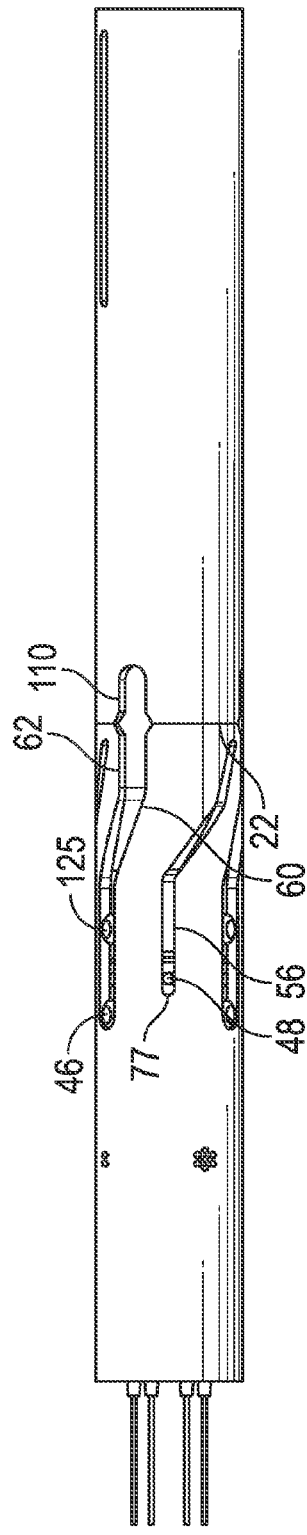
FIG. 19A
FIG. 19B

HARSH ENVIRONMENT CONNECTOR WITH ROTATING END SEAL ASSEMBLY

BACKGROUND

1. Field of the Invention

The present invention relates generally to an electrical, optical, or electro-optical connector for use in harsh environments such as subsea environments, and is particularly concerned with the seal assembly in receptacle and plug units of such connectors for closing and sealing contact chambers in the mating plug and receptacle units when de-mated, and for allowing communication between the two units on mating to allow first contacts in one unit to extend through or past the seals into other unit for contact with second contacts in the other unit, while still sealing the contacts from the external environment.

2. Related Art

There are many types of connectors for making electrical and fiber-optic cable connections in hostile environments. One type includes connectors for undersea mating and demating. Such underwater connectors typically comprise a plug unit containing one or more contact probes and a receptacle unit containing an equivalent number of receptacle contacts or junctions for engagement with the contact probes, which extend into the receptacle unit when the units are connected together. Typically, the contacts or junctions are contained in a sealed chamber containing dielectric fluid, and the probes enter the chamber via one or more normally sealed openings. One major problem in designing such units is the provision of seals which adequately exclude sea water from the contact chamber even after repeated mating and de-mating, and also prevent dielectric fluid from leaking out of the chamber.

A number of different sealing mechanisms have been proposed in the past for achieving this objective. One such sealing mechanism has an opening into the contact chamber which comprises an elastomeric tubular entrance surrounded by an elastomeric sphincter which pinches the entrance closed upon itself when the plug and receptacle units are in an unmated condition. In the mated condition, the sphincter pinches against the entering probe to form a seal. Although this type of seal is successful in some cases, it does have disadvantages. One disadvantage is that this seal does not work well under all hostile conditions. Another disadvantage is that such seals tend to lose their "memory" after repeated mating and de-mating, so that they may fail to close completely, or may not close quickly enough to isolate the chamber from the surrounding environment when the units are de-mated. Another type of known seal mechanism comprises a piston which moves axially into the seal opening as the units are de-mated.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated. Other known fiber-optic connectors have similar seals which are not suitable for use under some conditions and may tend to lose effectiveness after repeated mating and de-mating.

Some prior seal mechanisms are not completely effective in providing repeatable, reliable optical and electrical connections in adverse environments while maintaining electrical or optical contacts or terminals in isolated chambers at all times. Optical connectors can be expensive and generally require complicated means for terminating the connector elements or junctions to the cables they are intended to connect.

Harsh environment or underwater connectors are known in which dielectric fluid filled contact chambers in the plug and receptacle units are sealed at the front ends of the connectors by rotating seal elements which have openings aligned with corresponding openings into the contact chamber or chambers in the mated condition and offset from the openings in the unmated condition, for example as described in U.S. Pat. No. 5,685,727 of Cairns.

SUMMARY

Embodiments described herein provide for a connector having plug and receptacle units with rotating seal assemblies including elastomeric seal elements which rotate about the longitudinal axis of the connector when actuated to allow the contact stems of a first connector unit to pass through the seals into the contact chamber or chambers of the second connector unit and into engagement with the corresponding contact in the second connector unit.

According to one aspect, a connector assembly is provided which comprises first and second releasably mateable connector units, each connector unit having a longitudinal axis, a rear end, a front end, an outer shell, one or more contact chambers inside the shell, elongate stems carrying contacts at their front ends extending from the rear end of the respective connector unit into the contact chamber or chambers, and a seal assembly at the front end of the contact chamber which is movable between a sealed and closed condition sealing the contact chamber or chambers when the connector units are unmated, and a sealed and open condition when the connector units are mated, in which aligned openings in the seal assemblies allow the contact stems of the first connector unit to pass through the seal assemblies and into the contact chamber or chambers of the second connector unit and into engagement with aligned contacts at the ends of contact stems in the second connector unit.

In one embodiment, each seal assembly comprises a rotating seal member having an annular seal portion and a central through bore, a plurality of openings extending through the annular seal portion of seal member at spaced intervals in a ring around the central longitudinal axis of the connector, an outer housing or shell having a through bore in which the seal member is mounted with an outer face facing forwards for sealing engagement with the outer face of the opposing seal member during mating and de-mating, and a seal clamp member engaging the seal member, the seal clamp member and seal member being relatively rotatable about the longitudinal axis of the connector unit between a first position in which the seal openings are clamped shut by the seal clamp member and a second position in which clamp portions of the seal clamp member are offset from the seal openings.

According to another aspect, the first and second connector units have respective first and second manifolds inside the outer shells in which the respective contact chambers are located, with the seal assemblies located at the front end of the respective first and second manifolds. The first manifold and seal assembly are moveably mounted in the first shell and biased into a forward position in the shell when the units are unmated, and movable from the forward position into a retracted positions during mating, while the second manifold and seal assembly are configured to extend out of the second shell and into the first shell to push the first manifold and seal assembly inwards during mating, with forward seal faces of the sealing assemblies in face to face sealing engagement during mating and in the mated condition of the units. Each seal assembly has a plurality of radially outwardly extending cam lugs for engagement with respective cam slots in the first outer shell during mating and de-mating of the connector units, each cam slot having at least one straight portion parallel with the central longitudinal axis of the connector unit and at least one angled portion configured to rotate the respective seal member between the first and second positions when the respective cam lug travels in a first direction along the angled portion toward the rear of the connector unit. In one embodiment, the same set of cam slots actuates both seal elements to rotate between a closed and sealed condition and an open condition. In this embodiment, the respective seal elements are actuated sequentially rather than in unison as their respective lugs enter and travel along the inclined portions of the respective cam slots. In another embodiment, two separate cam grooves are provided for the cam lugs of seals in the respective connector units, so that the seal elements of both connector units are actuated simultaneously.

Other features and advantages of various embodiments will become more readily apparent to those of ordinary skill in the art after reviewing the following detailed description and accompanying drawings.

BRIEF DESCRIPTION OF THE DRAWINGS

The details of various embodiments of a harsh environment connector, both as to its structure and operation, may be gleaned in part by study of the accompanying drawings, in which like reference numerals refer to like parts, and in which:

FIG. 19A is a side elevation view of the plug and receptacle units of FIGS. 1 to 16B from a first direction, in the fully mated and connected positions;

FIG. 19B is a side elevation view of the mated plug and receptacle units as in FIG. 19A but with the mated connector rotated from the position of FIG. 19A to reveal more of the seal actuation cam grooves or slots.

DETAILED DESCRIPTION

Figure 1:
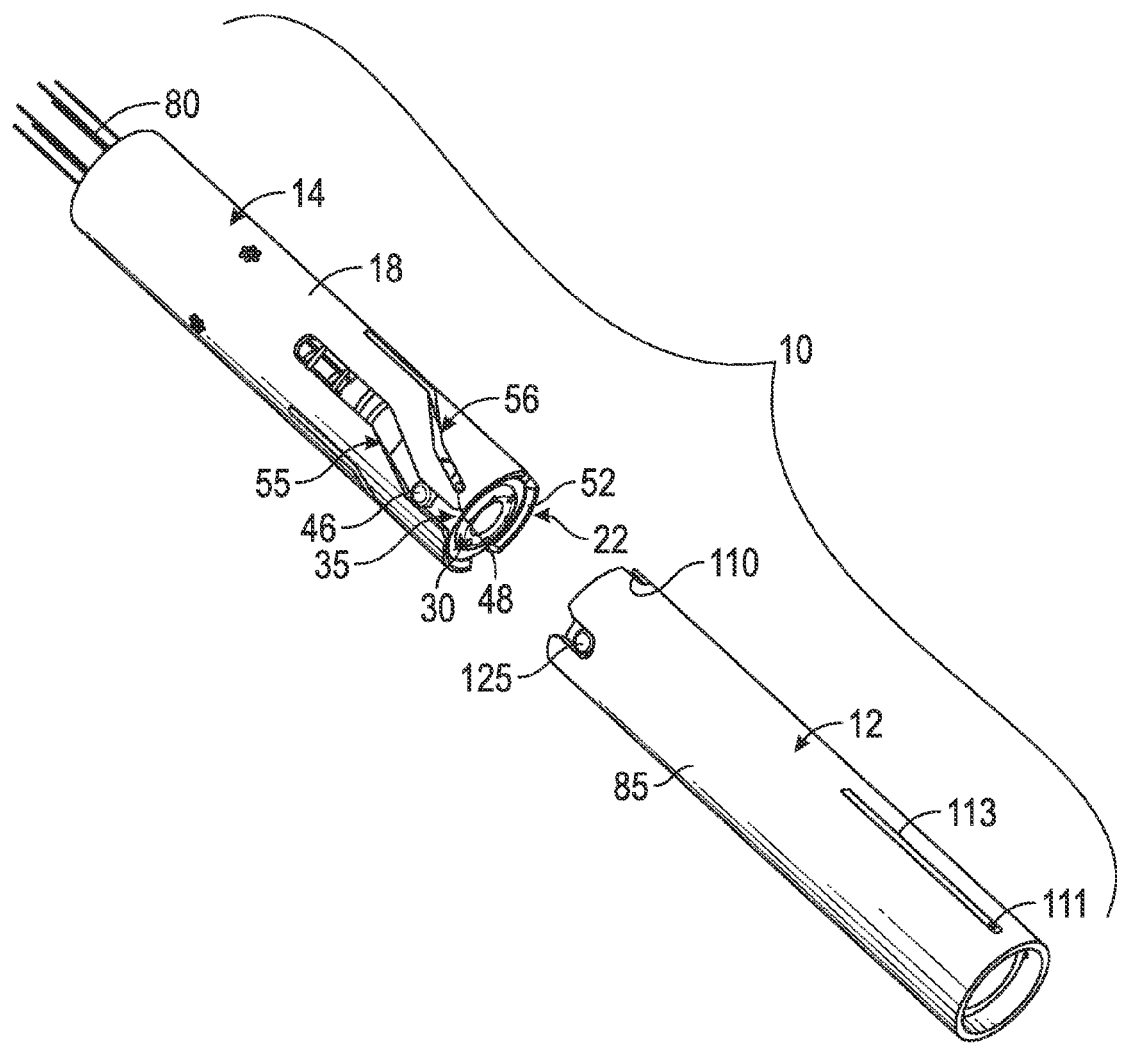
FIG. 1 is a perspective view of unmated plug and receptacle units of a harsh environment connector in alignment prior to mating engagement of the units.

Certain embodiments as disclosed herein provide for a harsh environment connector with end seal assemblies in the ends of sealed contact chambers of mating plug and receptacle units including rotating seals which rotate back and forth between open and closed, sealed conditions on mating and de-mating.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

FIGS. 1 to 21 of the drawings illustrate a first embodiment of a two part underwater, rotating seal connector 10 having first and second connector units for connecting optical, electrical, or electro-optical cables. The connector units comprise a fixed bulkhead or "plug" unit 12 and a mating "receptacle" unit 14 for releasable mating engagement with the plug unit. Although not illustrated in the drawings, in practice one or both of the plug and receptacle units may be enclosed in respective outer connector housings which may have flying lead handles for engagement by an ROV (remotely operated vehicle) manipulating arm when mating or de-mating the connector units underwater. When the plug unit is secured in a fixed bulkhead or wall of an instrument housing, the receptacle unit may be secured at the end of an underwater cable in an outer connector housing with an ROV lead handle. Such outer connector housings are well known in the field and are therefore not described in detail herein. The receptacle and plug units may also be bulkhead mounted and stab-plate mounted, than mated and held by the force of the larger connecting units (such as well-head components).

In the illustrated embodiment of FIGS. 1 to 21, the connector is a six way underwater or harsh environment optical connector designed for making fiber-optic connections. However, it will be understood that the connectors may be modified for making only electrical connections, only fiber-optic connections, or hybrid electro-optic connections. Additionally, it will be understood that the connector may alternatively be designed for making a different number of connections, for example a one way to six way or more connector, depending on the application. The connector may be used for making connections in any harsh environment, not only underwater or at great ocean depths, although it is particularly intended for use in underwater applications.

In the illustrated embodiment, oil-filled contact chambers 15, 16 in the plug and receptacle units are sealed at their front ends by seal assemblies which have rotating seals in their end faces which have through bores or openings which are sealed shut and offset from respective contact chamber inlets in the two units in the unmated condition, and which are unsealed and rotated into alignment with the chamber inlets in the mated condition. The contact chambers contain contacts aligned with the respective seal through bores in the mated condition, with the contacts in one unit extending through the respective aligned seal through bores to engage corresponding contacts in the chamber or chambers in the other unit, as described in more detail below. The contact chambers in each embodiment may be pressure balanced, dielectric fluid or oil filled chambers with the chamber walls defined by flexible bladders surrounding the contacts and providing pressure compensation between the pressure of fluid inside and outside the contact chamber by flexing inwardly or outwardly as appropriate, as is known in the field, see U.S. Pat. No. 5,685,727 of Cairns, for example, the contents of which are incorporated herein by reference.

Figure 2:
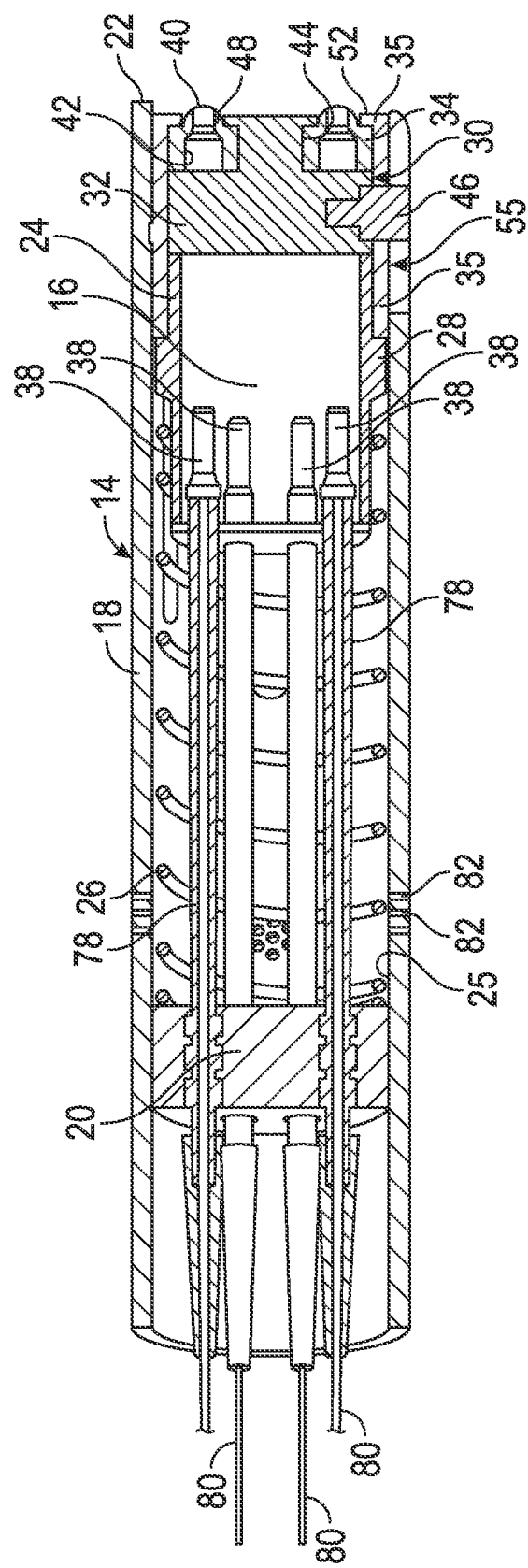
FIG. 2 is a longitudinal cross sectional view of the receptacle unit of FIG. 1 in the unmated condition with a rotating seal assembly at the front end of the unit in a closed, sealed condition.
Figure 3:
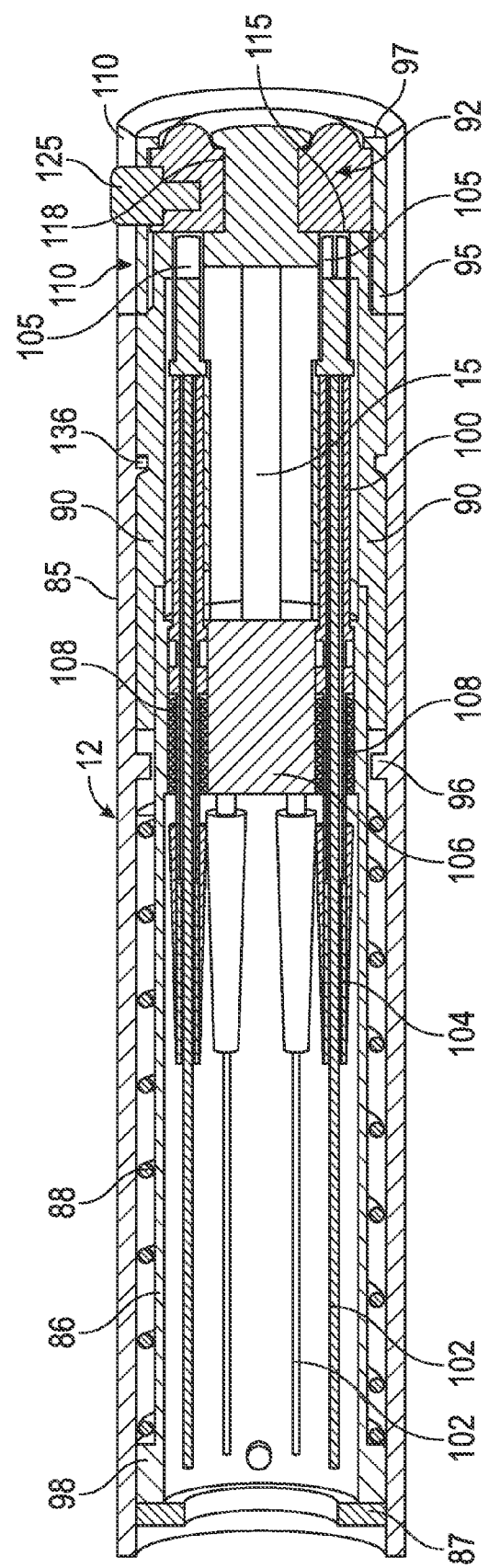
FIG. 3 is a longitudinal cross sectional view of the plug unit of FIG. 1 for mating engagement with the receptacle unit of FIG. 2, shown in the unmated condition with a rotating seal assembly at the front end of the unit in a closed, sealed condition.
Figure 4:
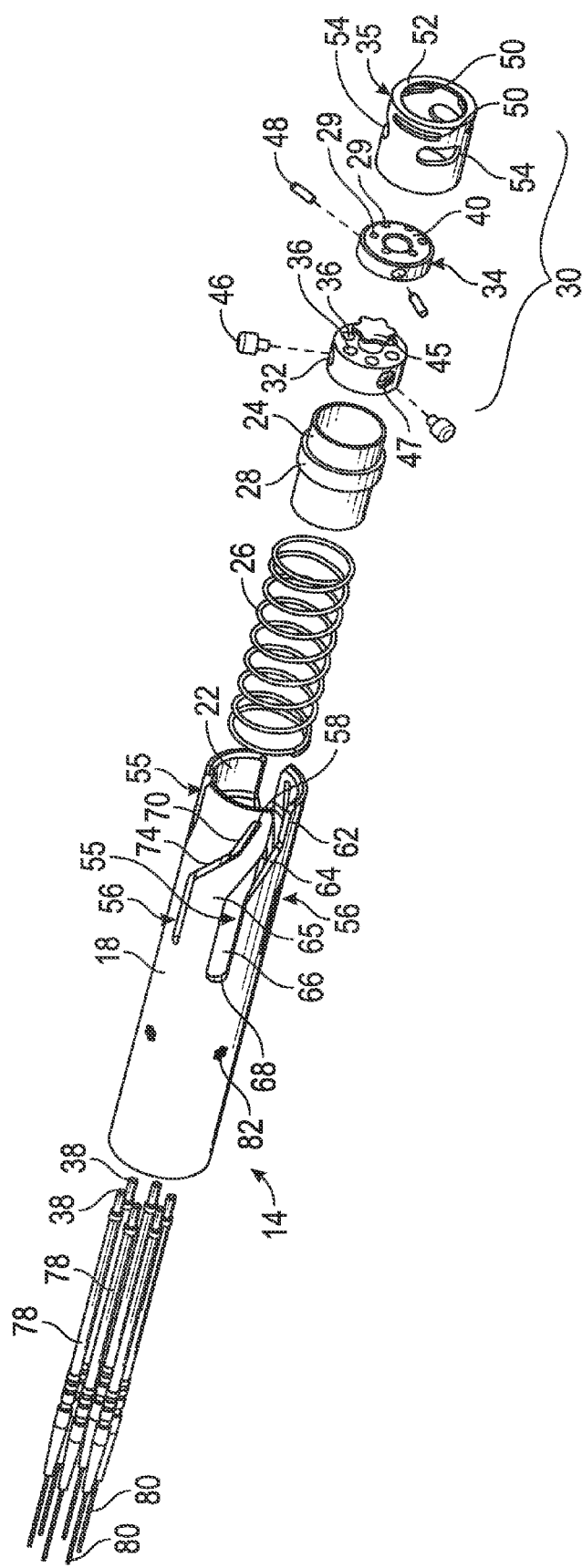
FIG. 4 is an exploded view illustrating separated components of the receptacle unit of FIGS. 1 and 2.
Figure 5:
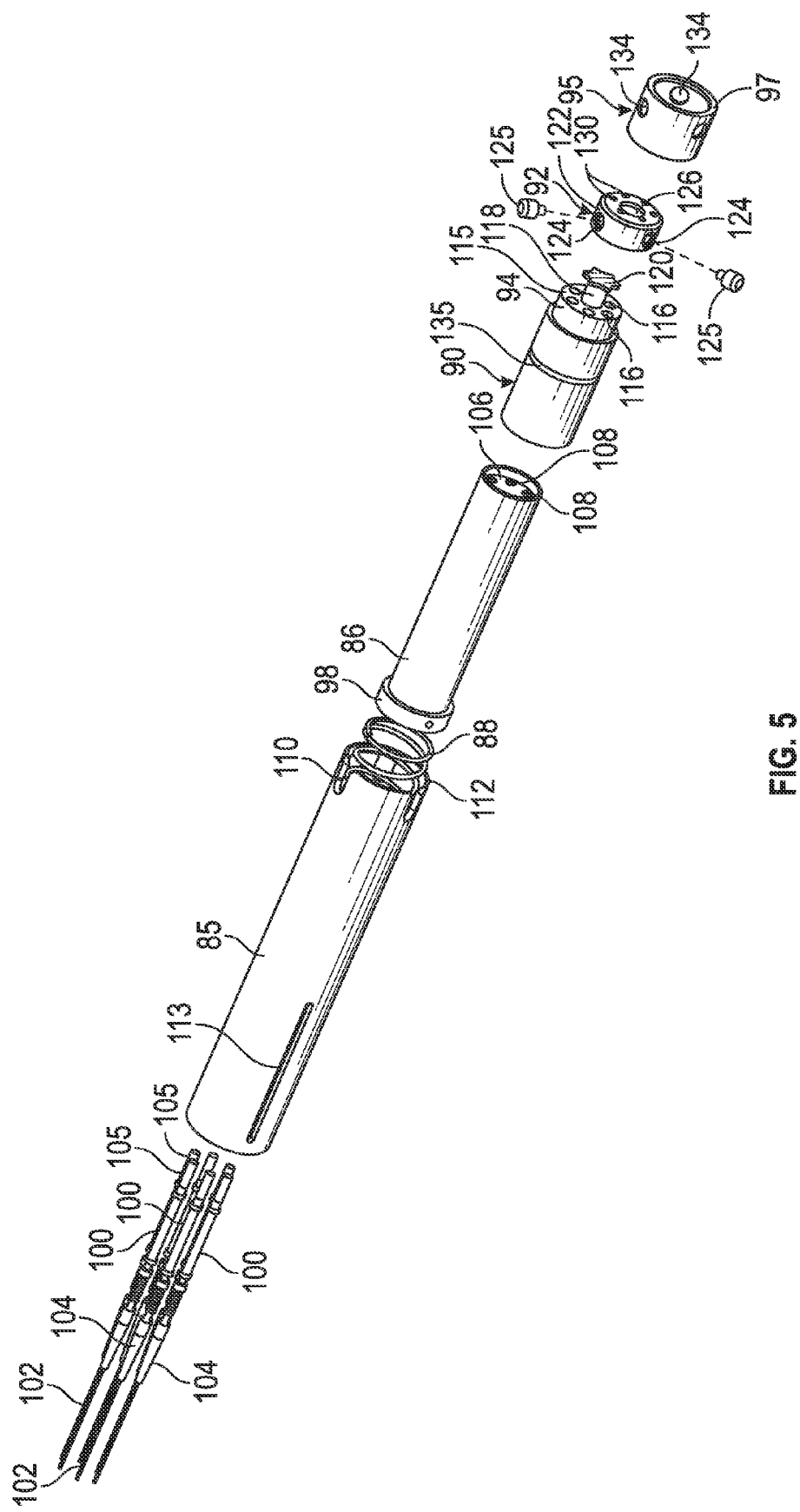
FIG. 5 is an exploded view illustrated separated components of the plug unit of FIGS. 1 and 3.
Figure 6:
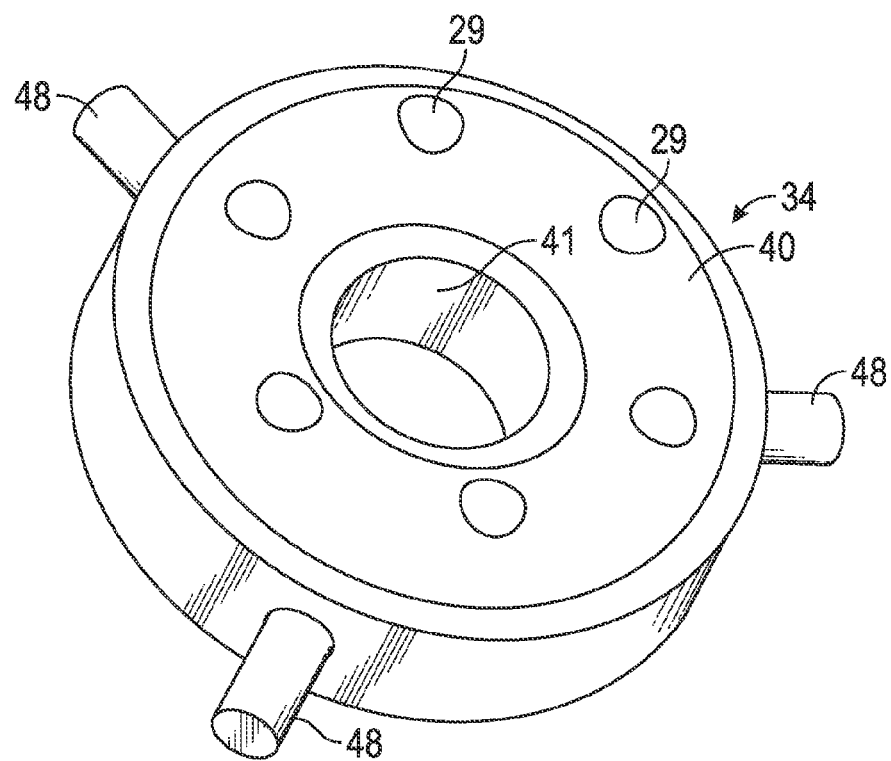
FIG. 6 is an enlarged perspective view of the receptacle seal of FIG. 4.

In the illustrated embodiment, harsh environment connector 10 comprises a plug unit 12 as illustrated in FIGS. 1 and 3 and a receptacle unit 14 as illustrated in FIGS. 1 and 2 which interconnect to form cylindrical connector 10 as illustrated in FIG. 19A to 21. FIGS. 4 and 5 illustrate the components of the receptacle and plug units, respectively, in a separated, exploded condition.

Figure 7:
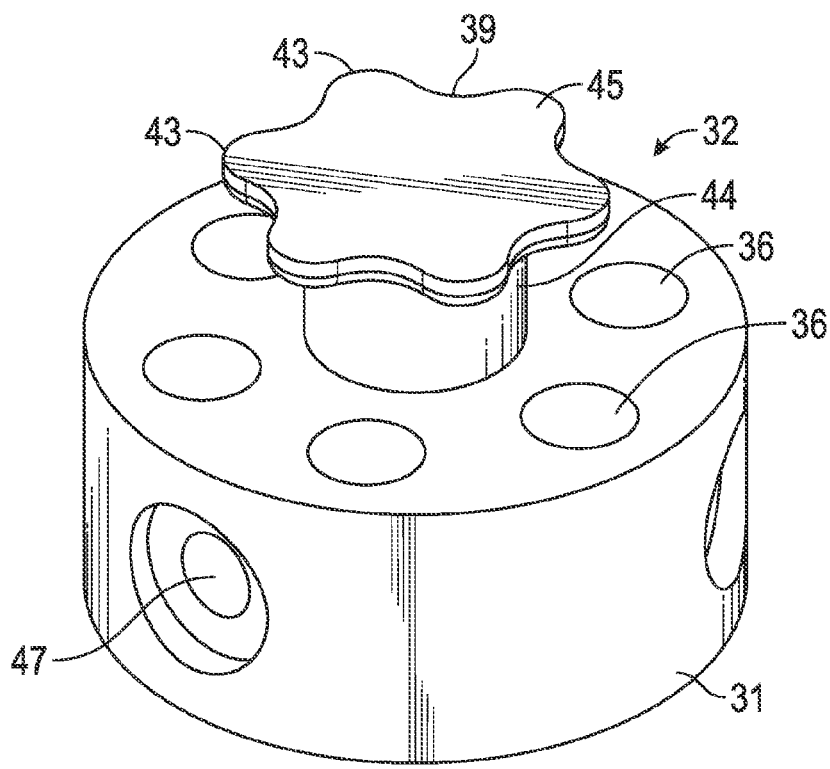
FIG. 7 is an enlarged perspective view of the seal rotator of FIG. 4.

As best illustrated in FIGS. 2 and 4, the first connector unit or receptacle unit 14 comprises an outer cylindrical shell 18 of rigid material having a sealed rear end wall 20 and an open front end 22. A hollow receptacle optical manifold 24 of rigid material is slidably mounted in the bore 25 in shell 18 and is biased into a forward position as in FIG. 2 by return spring 26, which acts between rear end wall 20 and annular shoulder 28 of manifold 24. Seal assembly 30 (FIG. 4) is mounted over a front end portion of manifold 24 and comprises seal rotator or clamp device 32 of rigid material, rotating seal 34, and rigid seal outer shell 35 which is linked to the receptacle manifold and slides axially with the manifold. Both manifold 24 and shell 35 are suitably prevented from rotating relative to shell 18, for example via a key or pin on manifold 24 slidably engaged in an alignment slot in shell 18. Seal rotator or clamp device 32 has an end wall which has a series of through bores or inlet passageways 36 which are aligned with respective optical contacts 38 in the receptacle chamber 16 in the mated condition of the units, and is rotatably mounted on the front end portion of manifold 24. The optical contacts 38 and through bores 36 are arranged at equally spaced intervals in a ring or circle around the central longitudinal axis of the receptacle, as illustrated in FIGS. 4 and 7. In the illustrated embodiment, the connector has six optical circuits, and in this case adjacent inlet passageways 36 and corresponding contacts 38 spaced around the annular ring pattern are separated by sixty degrees. Similar arrangements for different numbers of contacts may be provided in alternative embodiments, with a greater or smaller angular spacing between contacts dependent on the total number of contacts.

Figure 11A:
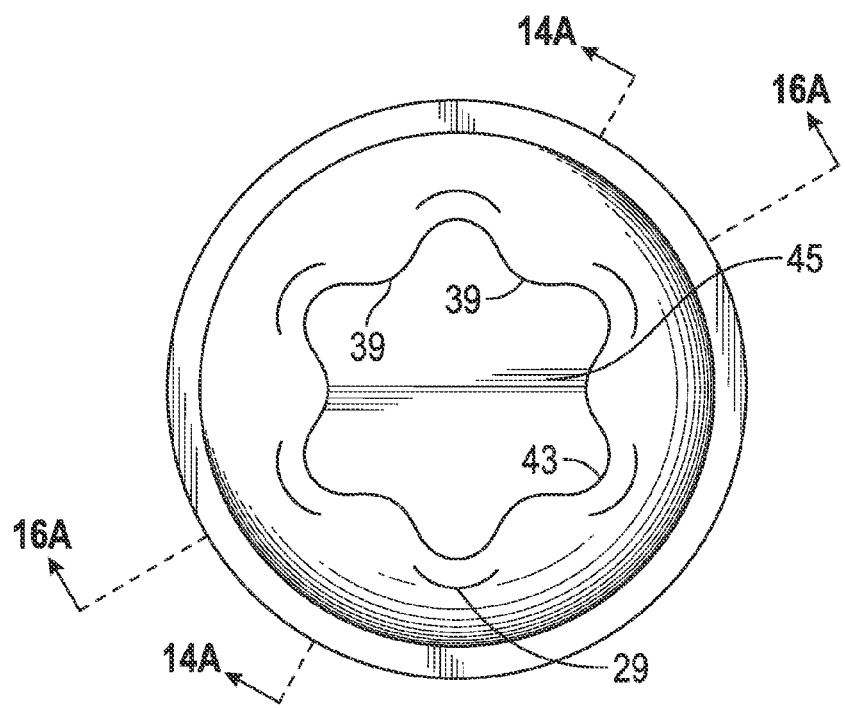
FIG. 11A is a top plan view of the assembled seal and seal rotator of the receptacle seal assembly in the closed and sealed condition.
Figure 11B:
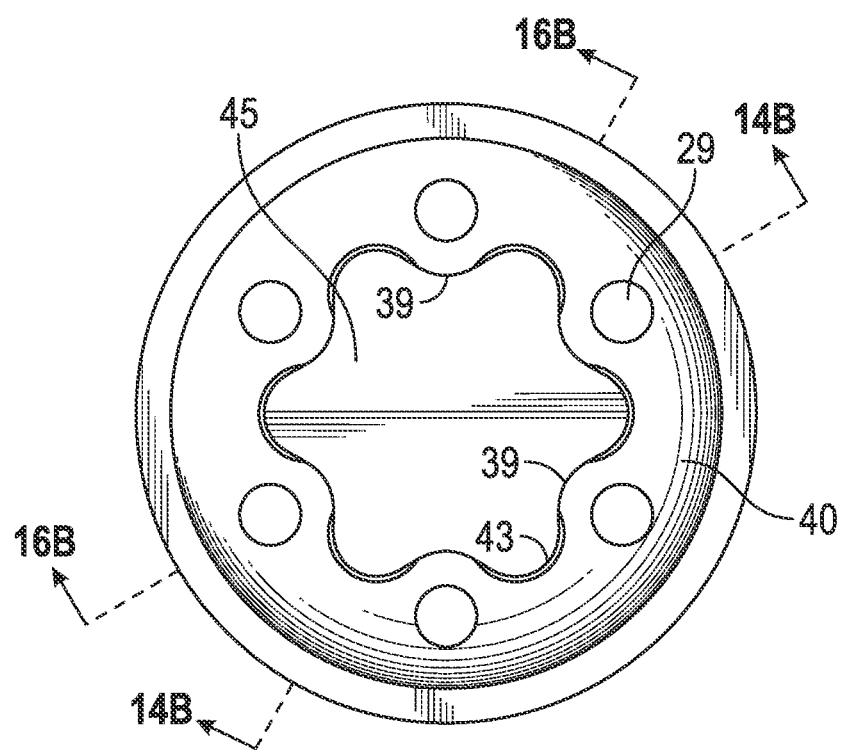
FIG. 11B is a top plan view similar to FIG. 11A but illustrating the seal rotator in a rotated position relative to the seal in which the seal openings are in an open condition.
Figure 12:
FIGS. 12 and 13 illustrate some alternative shapes for the front end openings of the rotating seals of the receptacle or plug units in the open condition prior to passage of the contacts through the seal openings.
Figure 13:
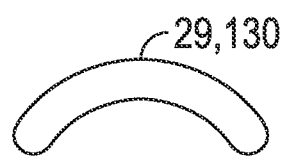

Rotating seal 34 is an annular member with a curved or convex outer or front annular sealing face 40 and a central through bore 41, as illustrated in more detail in FIGS. 6 and 11A to 16B. At least a major portion of rotating seal 34, including the curved front end portion, is of elastomeric material. A series of through bores or seal openings 42 extend through the annular seal 34 with outer end openings 29 at outer face 40 (see FIGS. 4 and 16B). Bores 42 are aligned with bores 36 in the front end wall of the clamp device 32 in the mated condition of the units (see FIG. 16B) and offset from bores 36 in the unmated, sealed condition of the units (see FIG. 16A), as described in more detail below. Seal rotator or clamp device 32 is illustrated in more detail in the enlarged view of FIG. 7 and has a generally cylindrical body 31 and a forwardly extending central stem 44 with enlarged star or flower shaped seal clamp or actuator portion 45 at its outer end. When the seal is assembled with seal rotator 32 as seen in FIGS. 2 and 11A to 16B, stem 44 and actuator 45 are rotatably engaged in the through bore 41 to allow relative rotation between seal rotator 32 and elastomeric seal 34. The enlarged seal actuator end 45 of stem 44 has alternating projections or lobes 43 and indents 39, with the number of lobes corresponding to the number of seal through bores 42. The outer diameter formed by the outer ends of lobes 43 is larger than the diameter of annular seal through bore 41, and the outer surface of the seal 34 is held at a fixed outer diameter by the rigid annular shell 35 in which it is engaged (FIGS. 2 and 4). Thus, the lobes apply a radially outward force on portions of the annular seal in which they engage, and act to squeeze or deform the overlying regions of the annular seal, as illustrated in FIGS. 11A and 16A for the sealed position and FIGS. 11B and 14B for the released position in which the lobes are offset from the seal openings 29. When the lobes are aligned with seal through bores 42 and open ends 29, the forward or front end portions of bores 42 are clamped or squeezed shut by the lobes, as illustrated in FIGS. 11A and 16A, and when they are offset from the seal through bores as in FIGS. 11B and 16B, the front ends 29 of the seal through bores 42 are free to open.

Figure 17:
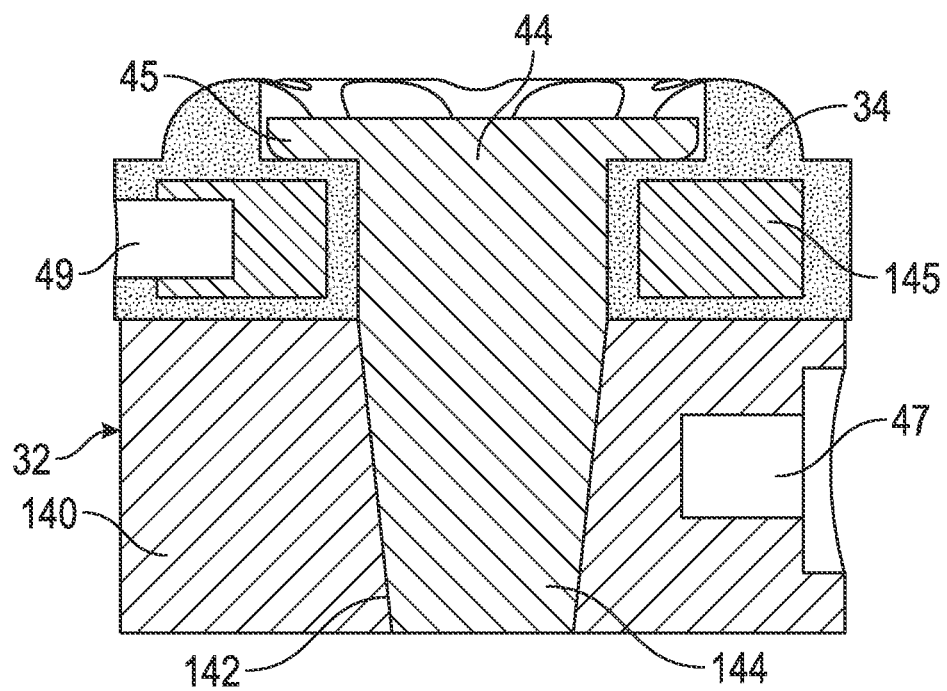
FIG. 17 is a cross-sectional view of the seal and seal rotator similar to FIG. 14B but illustrating a modified elastomeric seal with an embedded metal frame and a modified two part seal rotator.
Figure 18:
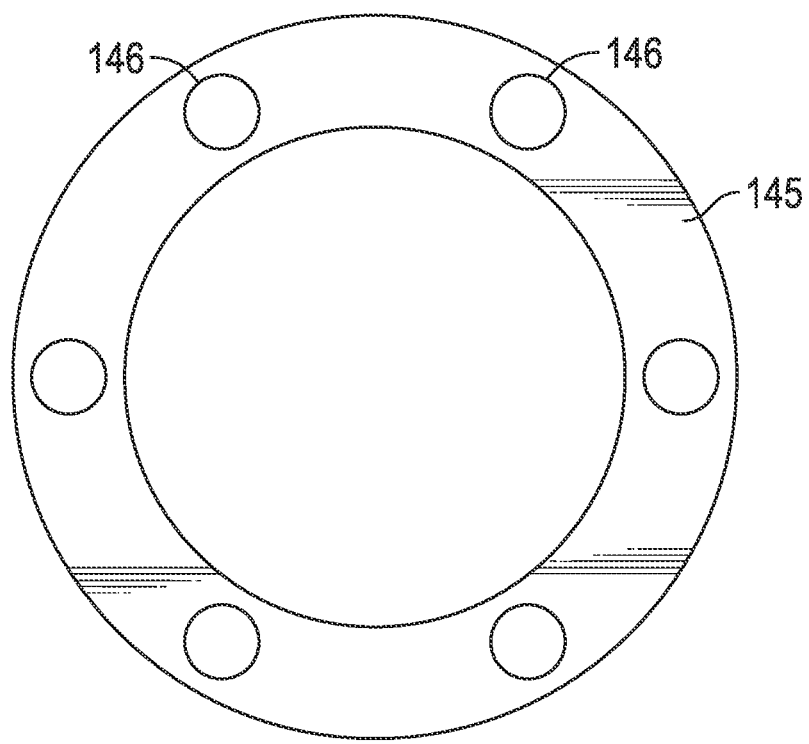
FIG. 18 is a plan view of the metal frame of FIG. 17 prior to molding of the seal material around the frame.

Although seal rotator 32 is shown as a one piece member in most of the drawings, in practice it may be made in two parts for ease of assembly with seal 34, as illustrated in FIG. 17. As indicated in FIG. 17, seal rotator 32 in one embodiment has a base portion 140 which includes the ring of through bores 36 and a tapered central bore 142, and the stem 44 has a tapered extension 144 which is a force fit or otherwise secured in tapered bore 142, for example by adhesive or screw threads. Additionally, the seal 34 in one embodiment is formed of elastomeric material overmolded onto a metal frame 145 for rigidity. Metal frame 145 is illustrated in more detail in FIG. 18 and comprises an annular ring shaped frame with openings 146 for alignment and integration with seal member bores 42. The two part construction of seal rotator 32 allows the stem 44 to be inserted through the front end of seal 34 with the projection engaged in bore 142 to secure the parts together while the elastomeric seal material at the open end of the seal is compressed or deformed by seal clamp or actuator 45 at the outer end of stem 44, 144.

A seal actuator mechanism for actuating seal opening and closing is provided between the seal assembly and receptacle shell. As best illustrated in FIGS. 1, 4, 6-8 and 11A to 16B, the actuator mechanism for the receptacle seal in the illustrated embodiment comprises radial pins or cam lugs 46, 48 on the seal assembly 30 and corresponding slots or grooves 55, 56 on the receptacle shell for receiving the outer ends of the pins or lugs. A series of three cam lugs 46 mounted in threaded mounting bores 47 in the base portion 140 of seal rotator 32 extend radially outwardly at spaced intervals around its periphery as seen in FIGS. 1, 4, 7, 19A and 19B, and a series of three seal cam lugs 48 extend outwardly from threaded mounting bores 49 at spaced intervals around the periphery of annular seal 34 (see FIGS. 1, 4, 6, 19A and 19B). The bores 49 in which seal cam lugs 48 are mounted extend into metal frame 145 as seen in FIG. 17 for rigid mounting of seal cam lugs 48. Cam lugs 46 are offset from cam lugs 48, as best illustrated in FIGS. 15A and 15B which show the offset between rotator cam lug mounting bores 47 and seal cam lug mounting bores 49.

Seal shell 35 is cylindrical and has a first set of three spaced slots 50 in a ring around its circumference adjacent outer or front end 52, and a second set of three spaced slots 54 in a ring around its circumference at a location spaced inward from the first ring of slots, as best seen in FIG. 4. The seal cam lugs 48 each extend radially outward through a respective one of the first set of slots 50, while the cam lugs 46 on seal rotator 32 each extend radially outward through a respective one of the second slots 54, which are circumferentially offset from slots 50 as seen in FIG. 4. The slots define the angular range of rotation of the seal rotator and annular seal.

The rotating seal assembly 30 is actuated by the two sets of radial cam grooves or slots 55, 56 along which the respective rotator cam lugs 46 and seal cam lugs 48 travel. As illustrated in FIGS. 1, 3, 10A and 10B, a first set of three equally spaced radial cam slots 55 extend along cam shell 18 from the open end 22 of the shell. A second set of three equally spaced cam slots 56 extend from a front end 58 spaced inwardly or rearwardly from the open end 22 of the shell, alternating with slots 55. The slots 55, 56 are shaped to control rotation of the seal rotator 32 and the seal 34 during mating and de-mating, as described in more detail below. Although the seal actuating grooves or slots in the illustrated embodiment are slots which extend completely through the cam shell wall to the outside of the shell, they may be grooves on the inner surface of the shell which do not perforate the shell wall in alternative embodiments. In alternative embodiments, a greater or lesser number of cam lugs and associated cam grooves or indents may be provided in the connector.

Figure 8:
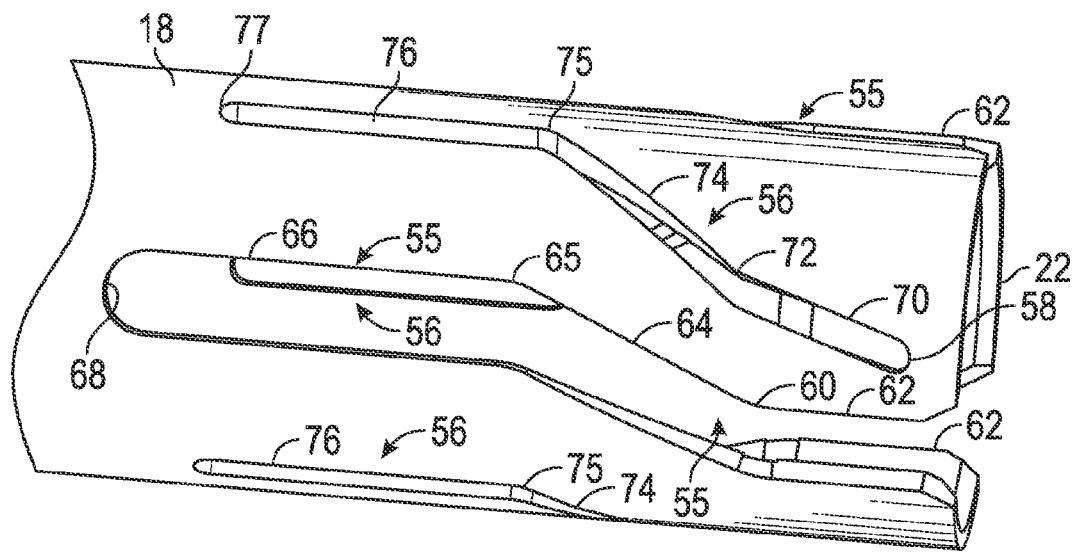
FIG. 8 is an enlarged perspective view of an end portion of the receptacle shell of FIG. 3 including the cam slots.

The shape of slots 55, 56 is shown in more detail in FIG. 8. In the closed and sealed, unmated condition of FIG. 1, each seal cam lug 48 is located at the front end 58 of the respective cam slot 56, while each rotator cam lug 46 is located at a position spaced inwardly from the open end of the respective slot 55, adjacent a bend 60. As illustrated in FIG. 8, each cam slot 55 has a first, straight part 62 which is parallel with the central longitudinal axis of the receptacle unit and extends up to bend 60, a second, angled part 64 extending up to a second bend 65, and a third, straight part 66 extending from bend 65 to the inner end 68 of the slot. Each cam slot 56 has a first angled part 70 extending to a first bend 72 which is parallel with angled part 64 of slot 55, a more angled part 74 extending from first bend 72 to second bend 75, and a third, straight part 76 extending from second bend 75 to the inner or rear end 77 of the slot which is parallel with the third, straight part of slot 55.

Optical stems 78 containing optical fibers 80 extend through bores in the rear end wall 20 of receptacle shell 18 and into contact chamber 16, where they terminate in ferrules or optical contacts 38, as best illustrated in FIGS. 2 and 4. Connections of the fiber to the alignment ferrules are made using standard epoxy and polish techniques. The rear end of the receptacle shell is suitably threaded or provided with other securing devices for connecting it to the end of a coaxial optical cable carrying optical fibers which are suitably connected to fibers 80. Although optical fibers only are illustrated in the drawings, a hybrid connector may be provided in an alternative embodiment with electrical leads passing through the bores of tubular housings or stems and terminating in an electrical socket for receiving electrical contacts of mating plug unit. Suitable seals (not illustrated) such as O-rings or Morrison seals are provided between each optical stem 78 and the respective rear end wall bore through which it extends to seal the end wall. Vents in vent screen 82 in the outer shell adjacent end wall 20 provide communication between the external environment and the interior of the shell surrounding an outer wall or bladder (not illustrated) enclosing contact chamber 16, for pressure compensation during mating and demating. In one embodiment, a sleeve-like bladder may extend between end wall 20 and receptacle manifold 24.

The second connector unit or plug unit 12 is illustrated in FIGS. 1 and 3 and the separated components of the plug unit are illustrated in FIG. 5. As best illustrated in FIG. 5, plug unit 12 basically comprises an outer cylindrical, hollow plug shell 85, a plug stem shell 86 engaged inside the plug shell, an oil-filled plug manifold 90, a return spring 88, an annular seal 92 similar to the seal 34 of the previous embodiment rotatably engaged over forward, seal actuator end portion or clamp device 94 at the front end of plug manifold 90, a hollow seal shell 95 rotatably mounted in the front end of plug manifold 90 over annular seal 92, and a plurality of rigid optical stems 100 containing optical fibers 102 extending from a fiber optical or hybrid cable through boot seals 104 into the rear ends of the stems 100 and through bores in the stems up to the front ends of the stems, where they terminate in ferrules or optical contacts 105, as illustrated in FIGS. 3 and 5.

As best illustrated in FIG. 3, return spring 88 acts between an internal rib or shoulder 96 on the plug outer shell 85 and an annular rim 98 at the rear end of plug stem shell 86 to urge the stem shell 86 into the rear position against stop ring 87 (see FIG. 3). Plug stem shell 86 has a solid front end portion or wall 106 having through bores 108 through which optical stems 100 extend into sealed, oil-filled contact chamber 15 of the plug manifold 90, which is secured over the front end of plug stem shell 86 as illustrated in FIG. 3, with the front end portion 106 of stem shell 86 engaging in the rear end of contact chamber 15. A suitable flexible bladder or sleeve (not illustrated) surrounds contact chamber 15 for sealing and pressure compensation during mating and de-mating. In one embodiment, the bladder may extend inside plug manifold 90 between the front end of stem shell 86 and front end wall 115 of chamber 15.

Outer shell 85 has a series of three slots 110 extending inward from front end 112, as well as a pair of diametrically opposed alignment slots 113 extending from the rear end. Alignment slots 113 receive alignment pins 111 projecting outward from the annular rim 98 at the rear end of plug stem shell to prevent rotation of outer shell 85 as it is urged by receptacle shell into the retracted position of FIGS. 20 and 21 during mating, and biased by spring 88 back to the extended position of FIG. 3 during de-mating.

As noted above, plug manifold 90 incorporates a plug seal rotator or clamp device 94 similar to the seal rotator or clamp device 32 of the receptacle unit. As seen in FIG. 3, the plug manifold 90 is hollow and open at its rear end for sealing engagement over the closed front end 106 of plug stem shell 86, which forms the rear end wall of the contact chamber 15. Front end wall 115 of manifold 90 forms the front end wall of chamber 15, and has a series of passageways or contact chamber inlets 116 arranged in a ring around the front end in alignment with the respective contacts 105 in the plug contact chamber 15. A central stem 118 extends forwards from the front end wall 115 and terminates in an enlarged star or flower shaped seal actuator or clamping portion 120 similar to actuator or clamping portion 45 of the receptacle seal rotator. Rather than being formed integrally with front end wall 115, in one embodiment stem 118 may have an extension for engagement in a corresponding central bore in the front end wall 115 of manifold similar to the tapered stem portion shown in FIG. 17 for the receptacle seal rotator 32.

Figure 9:
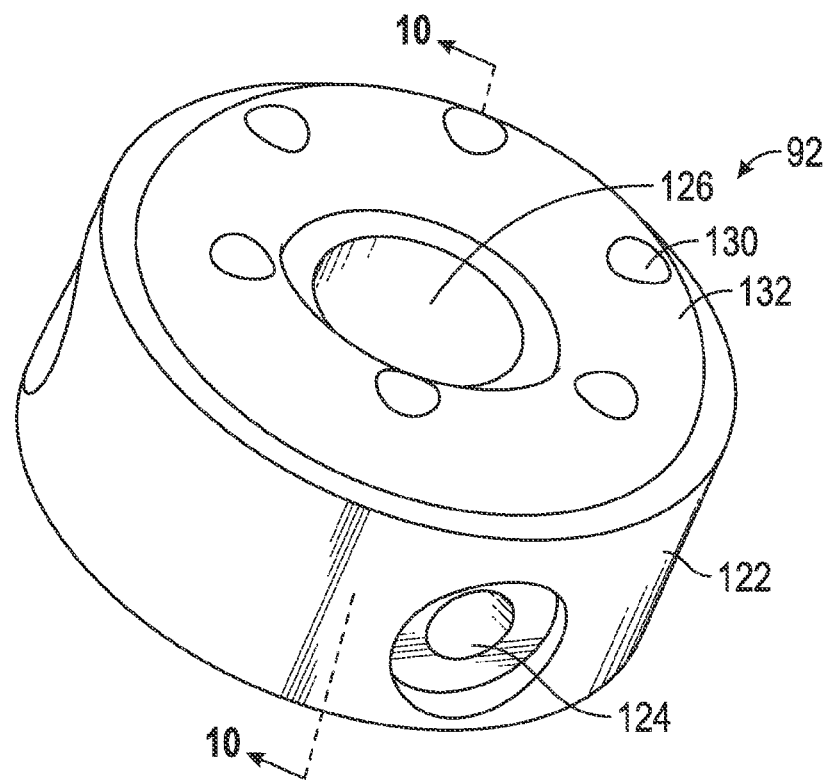
FIG. 9 is an enlarged perspective view of the plug seal of FIG. 5.
Figure 10:
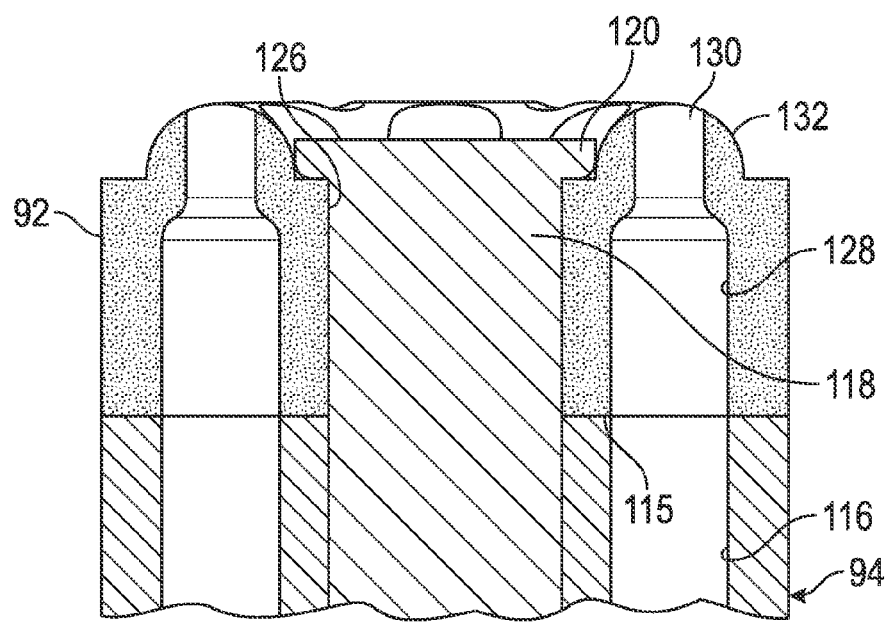
FIG. 10 is a cross-section on the lines 10-10 of FIG. 9 illustrating the plug seal assembled on the front end of the plug manifold of FIG. 4 and in an open position.

The rotating seal 92 of the plug unit is illustrated in more detail in FIG. 9 and has a generally cylindrical, annular body 122 with a series of three spaced mounting bores 124 for receiving radially projecting cam lugs 125, as illustrated in FIG. 5, and a central through bore 126. Cam lugs 125 together with actuator grooves or slots 55 in the receptacle shell comprise the actuator mechanism for moving seal 92 between open and closed positions during mating and de-mating, as described in more detail below. A series of six through bores or opening 128 extend axially through the annular portion of the seal 92, terminating in reduced diameter seal openings 130 at the forward, curved annular end face 132 of the seal, as best illustrated in FIG. 10, which is a vertical cross-sectional view illustrating the seal 92 engaged over the stem 118 and actuator 120 of the front end portion 94 of plug manifold or seal rotator 90. Seal bores 128 are aligned with the respective openings or inlets 116 in the end wall 115 of the plug seal rotator 90. As in the case of rotating seal 34 of the receptacle unit, rotating seal 92 may be made entirely of suitable elastomeric material but is suitably made by overmolding elastomeric material over a metal frame similar to metal frame 145 of FIG. 18. The metal frame in this case may be thicker in order to accommodate the larger radial mounting bores 124 for receiving cam lugs 125.

Seal shell 95 is a cylindrical sleeve open at both ends, and has a series of three openings 134 in its cylindrical wall aligned with cam lugs 125. Lugs 125 extend from seal 92 through openings 134 into the respective end slots 110 of the plug shell when the plug unit is fully assembled, as illustrated in FIGS. 1 and 3. Front end 97 of seal shell 95 has an inwardly extending rim which engages the front end of seal 92, as illustrated in FIG. 3.

Figure 14A:
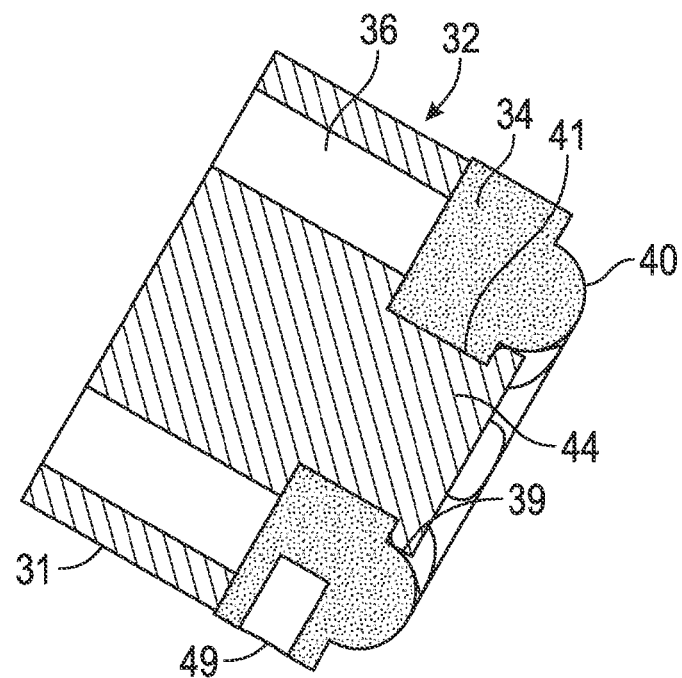
FIG. 14A is a cross-sectional view on the lines 14A-14A of FIG. 11A.
Figure 14B:
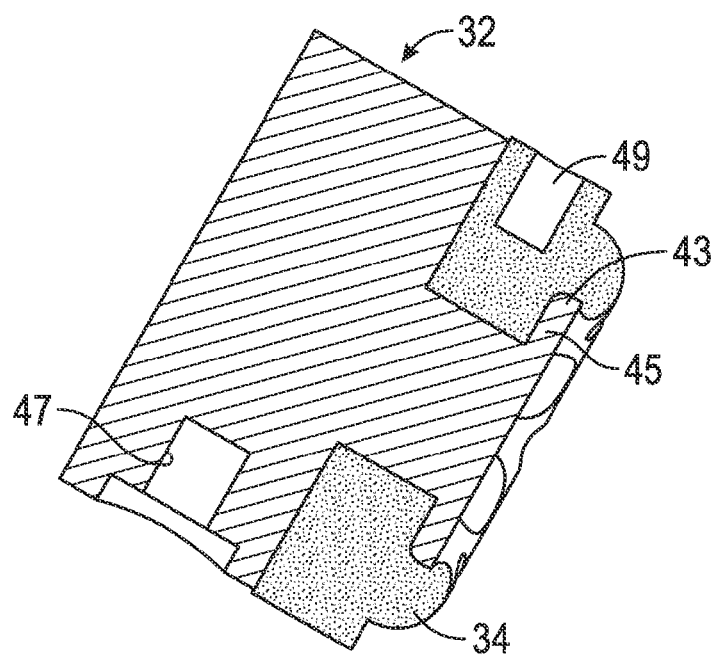
FIG. 14B is a cross-sectional view on the lines 14B-14B of FIG. 11B.
Figure 15A:
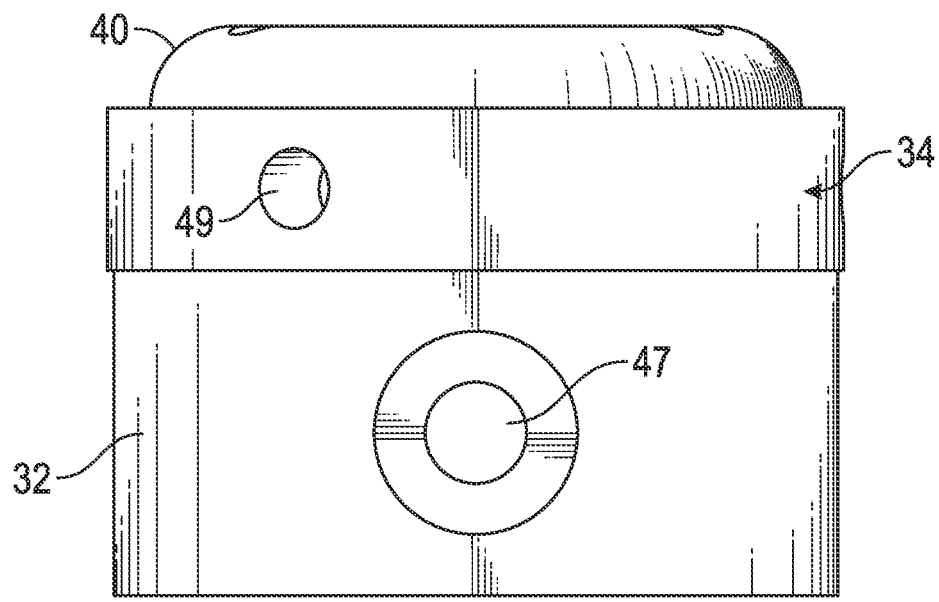
FIG. 15A is a side elevation view of the assembled seal and seal rotator in the closed and sealed condition of FIG. 11A.
Figure 15B:
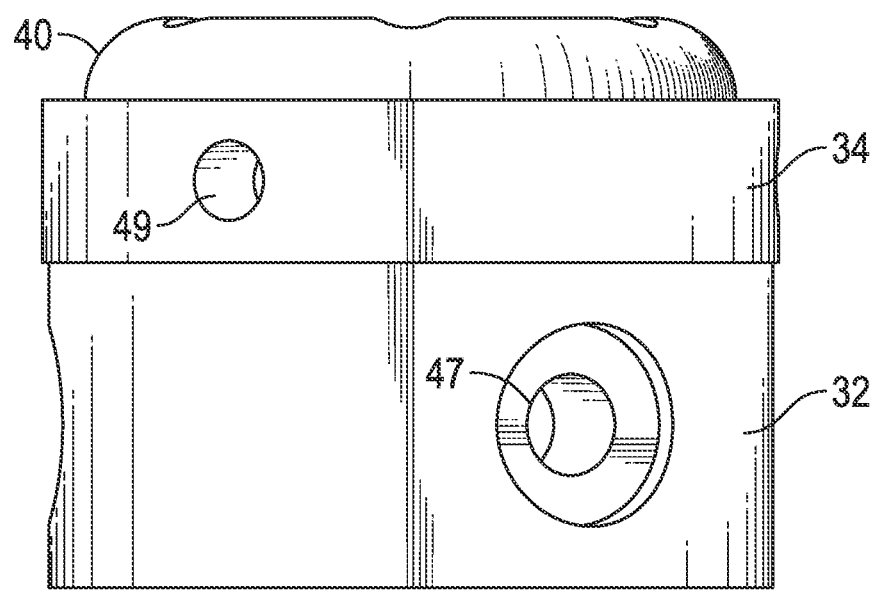
FIG. 15B is a side elevation view similar to FIG. 15A but illustrating the rotated position of FIG. 11B.
Figure 22:
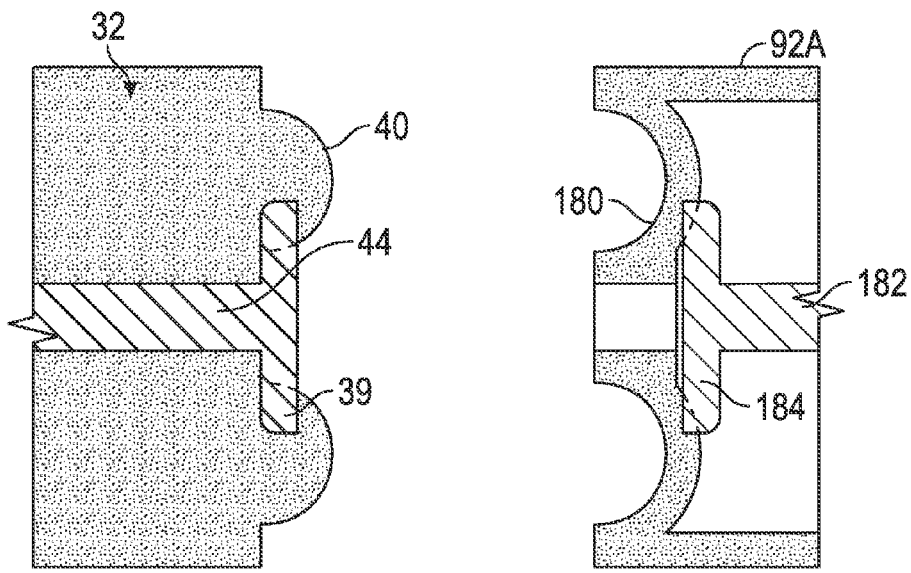
FIG. 22 is a cross sectional view similar to that of FIG. 14A illustrating opposing rotating seal members of two connector units of a modified connector, in which the rotating seal member of one of the connector units has a modified seal face and seal clamp.

In the foregoing embodiment, both rotating seals 34 and 92 have convex outer end faces, as seen in FIGS. 14A and 10, respectively. However, in alternative embodiments, the seals may have mating convex and concave annular end faces, as illustrated in FIG. 22. In this case, seal 34 is shown with a convex annular end face 40 and is identical to the rotating seal illustrated in FIGS. 11A to 14B, while the opposing rotating seal 92A has a concave annular end face 180 for mating engagement with convex annular end face 40. In alternative embodiments, the concave seal end face may be provided on the receptacle seal rather than the plug seal. In view of this change to the seal end face, the seal clamp 182 of seal 92A in this embodiment is "internal"; in order to keep the seal openings clamped shut in the unmated condition. The enlarged seal actuator end 184 of seal clamp 182 is of exactly the same dimensions as that of the previous embodiment, but the outer rim of actuator end 184 engages the convex annular portion of seal 92A on the inside of the seal to squeeze the seal openings shut in the unmated condition, as illustrated in FIG. 22.

Operation of the seal assemblies during mating and de-mating is described in more detail below. As noted above, FIGS. 1-3, 11A and 16A illustrate the end seals in the closed and sealed condition, prior to mating of the plug and receptacle units. When the end seals are in this condition, the spaced through bores 42, 128 around the center opening of the seals are offset from the corresponding through bores 36 and 116 in the respective seal rotators 32, 94, effectively sealing the front end passageways or inlets of the receptacle and plug contact chambers 16, 15, respectively (see FIG. 14A for the receptacle unit). The seal 92 of the plug unit is in a similar position relative to seal rotator 94 in the unmated condition of the units. Additionally, the end actuators 45, 120 on the respective seal stems are positioned with the enlarged lobes 43, 121 aligned with the front end portions 29,130 of the seal through bores, as illustrated in FIGS. 2 and 3 as well as FIGS. 11A and 16A for the receptacle seal, so that the elastomeric seal material is deformed inwards to seal the openings 29, 130 shut. Although the front end openings 29, 130 of the receptacle and plug seals 34, 92 are shown as circular in shape in the illustrated embodiment, this is for illustration purposes only and they may be of other shapes, such as slot-like as in FIG. 12 or crescent shaped as in FIG. 13 to match the curvature of the actuator lobes, so that the open ends of the seal bores are more readily squeezed shut in the closed, sealed condition illustrated in FIG. 11A. These openings are forced or deformed into a cylindrical shape by the receptacle stems when they are pushed through the seal openings on mating of the units, as described below.

As best illustrated in FIGS. 1, 2 and 3, when the plug and receptacle units are unmated or separated, cam lugs 46 are located in slots 55, adjacent the first bend 60 of each slot, while plug cam lugs 125 are located at the inner ends of slots 110 in the front end of plug shell 85. The cam lugs 48 on receptacle seal 34 are located at the front ends 48 of the respective cam actuator slots 56. As the aligned plug and receptacle units of FIG. 1 are moved into engagement, the front end 22 of receptacle shell 18 first engages the front end 112 of the plug shell 12 with the slots 55 aligned with the respective plug slots 110, and starts to urge the plug shell rearwards, compressing return spring 88, while the plug manifold 90 and attached end seal assembly 92, 95 are plunged into the receptacle shell 18, and the front end 97 of plug seal shell 95 engages the opposing front end 52 of plug seal shell 35, pushing the receptacle manifold and seal assembly rearward into the receptacle shell and compressing receptacle return spring 26. At the same time, the opposing curved, annular front faces 40, 132 of the seals are pressed flat against one another, into sealing engagement.

As the receptacle manifold and seal assembly start to move inward relative to receptacle shell 18, the receptacle seal cam lugs 48 first start to move along inclined parts 70 of slots 56, so that the seal 34 rotates relative to plug seal 92. Due to the opposing front curved faces of the two seals, this relative rotation sweeps debris away from the seal faces. At the same time, the seal rotator 32 rotates in unison with the seal 34 as the respective lugs 46 and 48 pass along matching inclined parts 70 and 64 of the respective slots 55 and 56, so that the seal openings remain offset from the rotator bores or passages 36. As the plug and receptacle units continue movement towards full mating engagement, seal cam lugs 48 enter the steeper inclined parts 74 of slots 56 while cam lugs 46 move along less inclined parts 64 of slots 55. Seal 34 is then rotated relative to seal rotator 32, bringing the seal through bores 42 into alignment with rotator bores 36, and also rotating the seal actuator 45 from the position shown in FIG. 11A to the position shown in FIG. 11B, removing the sealing force closing seal openings 29. At the same time, plug seal 92 and plug manifold 90 enter the front end of the receptacle shell, and cam lugs 125 on the plug seal move from slots 110 into slots 55 respectively. Cam lugs 125 initially travel along straight parts 62 of slots 55, so that the seal openings 130 still remain sealed shut and offset from the bores or passageways 116 leading into the plug contact chamber.

As the lugs 125 enter and move along angled parts 64 of cam slots 55, seals 92 are rotated relative to the seal actuator portion of plug manifold 90, rotating the seal openings 130 into alignment with the through bores or passageways 116 in the front end wall 115 of the manifold, and into alignment with the indented portions of the flower shaped plug seal actuator 120, so that the seal openings 130 are no longer compressed or squeezed into a sealed shut condition. As the lugs 125 travel along angled parts 64, receptacle lugs 46 and receptacle seal lugs 48 are both traveling along straight parts 66, 76 of the respective slots 55, 56, so that plug seal 92 also rotates relative to the receptacle seal 34, into alignment with the seal openings. Plug seal cam lugs 125 enter the straight parts 66 of slots 55 when the plug and receptacle seal openings are in alignment.

Figure 20:
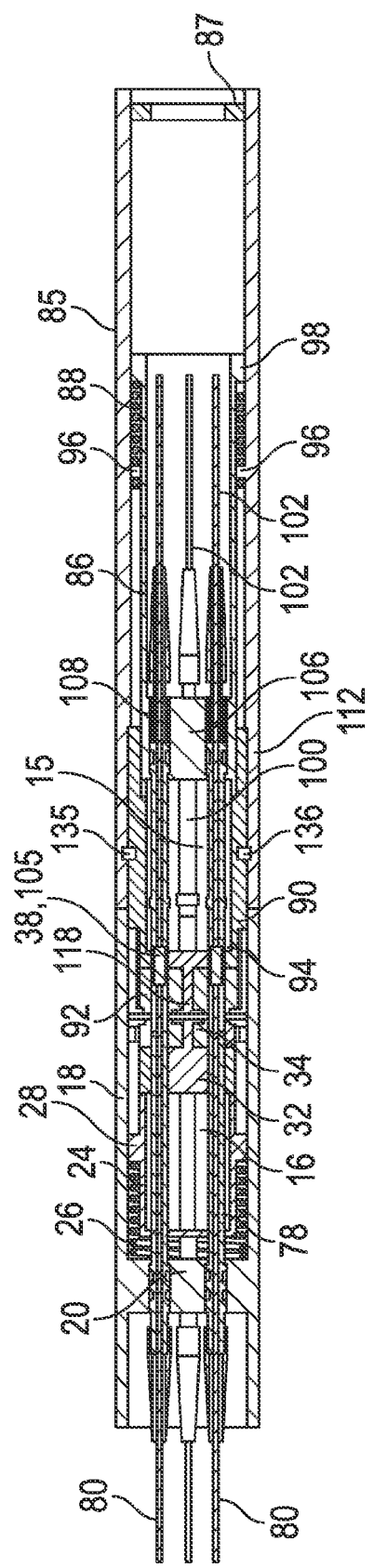
FIG. 20 is a longitudinal sectional view of the mated plug and receptacle units on the lines 20-20 of FIG. 19A, with the rotating seal members rotated into an open condition and plug contacts extending through the aligned openings into the receptacle unit for contact with corresponding receptacle contacts in the receptacle contact chamber.
Figure 21:
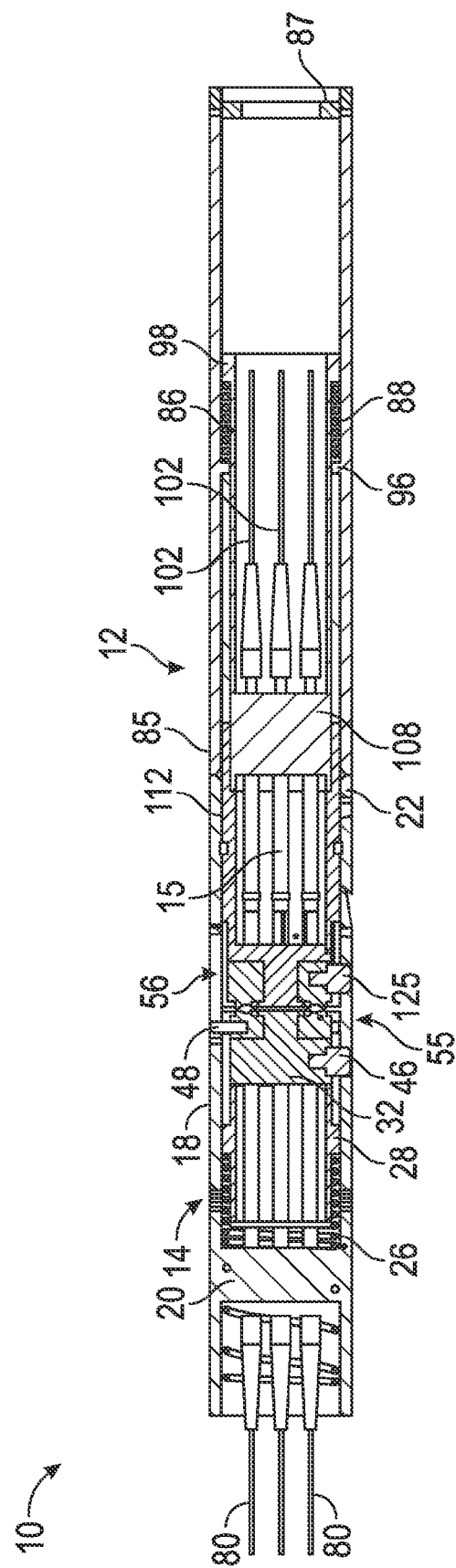
FIG. 21 is a longitudinal sectional view of the mated plug and receptacle units on the lines 21-21 of FIG. 19A.

All of the cam lugs are now in inner or rear straight parts of the respective grooves/slots in receptacle shell, so no further rotation occurs. As receptacle manifold and seal assembly continue to be pushed inward by the plug manifold as it is forced further into the receptacle shell, the receptacle contacts 38 move through the aligned bores and end openings in the plug and receptacle seal assemblies, forcing the seal end openings or reduced diameter bore portions in the two end seals into a fully open condition in sealing engagement with the outer surfaces of the respective optical contact stems 78. Receptacle contacts 38 then move into mating engagement with the fiber optic contacts or ferrules 105 of plug unit 12 in plug contact chamber 15, as illustrated in FIGS. 20 and 21. The plug and receptacle units are fully mated when the receptacle cam lugs 46 reach the ends of slots 55, as seen in FIGS. 19A and 19B.

Silicone oil inside the contact chambers 15,16 of the plug and receptacle manifolds helps to keep the optical faces of the contacts clean at all times and provides pressure balance via elastomeric bladders (not illustrated) surrounding the contact chambers that are exposed to the external environment through vent screens or holes in the receptacle and plug shells.

In one embodiment, the plug and receptacle units are held together on mating by larger units or coupling devices in which they are installed and which are pressed together to connect the units. In this case, the force holding the larger units together also keeps the connector units mated, and there is no need for a latching mechanism between the plug and receptacle units themselves. If needed in other embodiments, a suitable latching mechanism may be provided, for example a canted coil spring (such as a Bal Seal Canted Coil Spring® as manufactured by Bal Seal Engineering, Inc. of Foothill Ranch, Calif.) may be seated in an annular groove of appropriate geometry in the outer surface of plug manifold 90 for latching engagement in a corresponding inner annular groove in the receptacle shell when the units are fully mated. The latch mechanism may be arranged so that there is a lower mating force and a higher de-mating force.

Figure 16A:
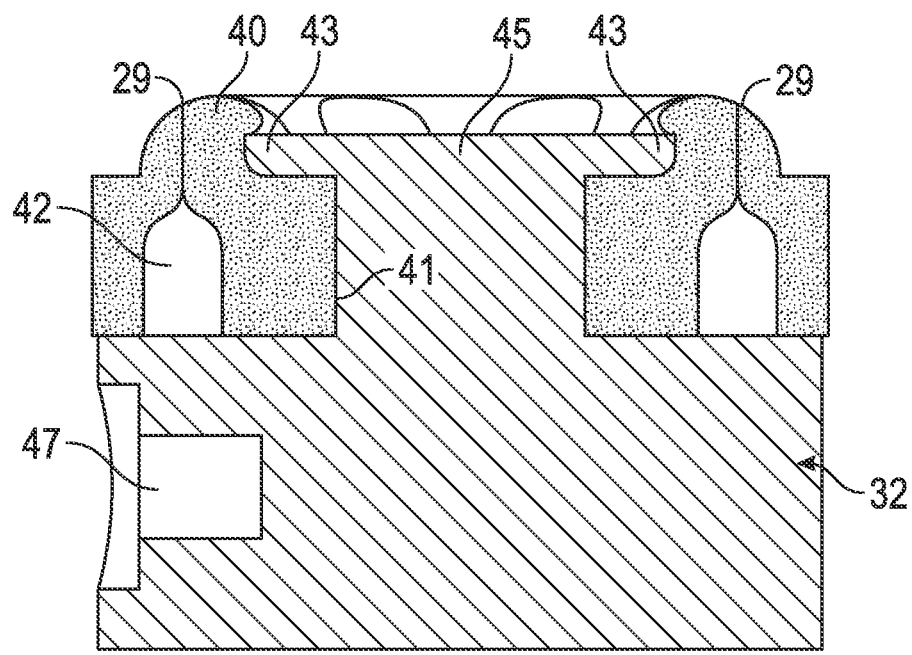
FIG. 16A is a cross-sectional view on the lines 16A-16A of FIG. 11A illustrating the seal in the closed and sealed condition.
Figure 16B:
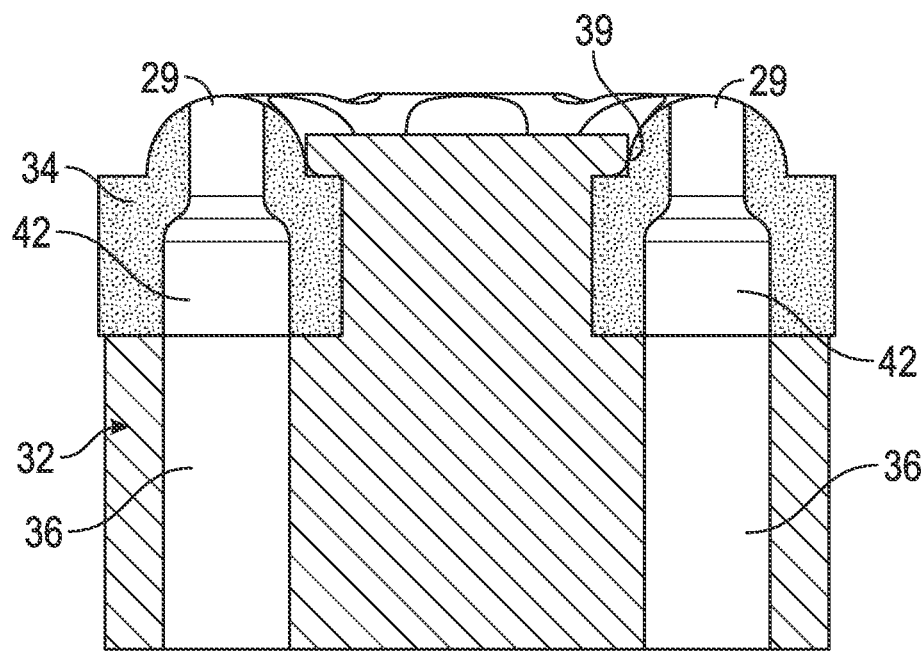
FIG. 16B is a cross-sectional view on the lines 16B-16B of FIG. 11B illustrating the seal openings in an unlocked, open configuration.

The de-mating sequence to separate the plug and receptacle units is the reverse of the mating sequence described above. The opposing end seals are held in face to face sealing engagement until the passageways into both contact chambers are again sealed shut, as illustrated in FIGS. 11A and 16A for the receptacle unit. Prior to the start of de-mating, cam lugs 46 and 125 of the receptacle seal rotator and plug seal, respectively, are located in cam slots 66 at the positions shown in FIGS. 19A and 19B, while receptacle seal cam lugs 48 are located at the inner or rear ends 77 of the respective cam slots 56. No rotation of the seals occurs while the lugs travel along straight parts of the respective slots. As the plug manifold starts to be withdrawn from the receptacle shell, return spring 26 urges the receptacle manifold 24 and seal assembly 30 forwards, and the receptacle contacts simultaneously start to withdraw from the plug contact chamber. When the plug seal lugs 125 enter and travel along the inclined parts 64 of the respective slots 55, the plug seal rotates and the end seal openings are again squeezed shut by the projecting lobes of actuator 120, while the seal through bores again move out of alignment with the manifold passageways 116, sealing the plug contact chamber.

As the receptacle seal cam lugs 48 and seal rotator cam lugs 46 enter the respective inclined passageway parts 74 and 64, the receptacle seal 34 initially rotates relative to receptacle seal rotator 32, until the front end openings 29 of the seal are again sealed shut by actuator 45 as illustrated in FIGS. 11A and 16A, and the passageways 36 into the receptacle contact chamber 16 are no longer aligned with the seal through bores 42, sealing the receptacle contact chamber, as illustrated in FIG. 14A. The receptacle seal 34 and seal rotator 32 then rotate in unison until cam lugs 48 reach the front ends 58 of slots 56 and cam lugs 46 reach the straight part 63 of slots 55 sealed position of FIG. 1. Plug seal lugs 125 move back into the slots 110 at the front end of the plug shell 85, and the units are separated. Prior to sealing of the chambers, the receptacle contacts withdraw back into the receptacle contact chamber. The timing is such that both contact chambers are fully sealed, both by the offset between the seal openings and chamber inlets and the squeezing shut of the front end portions of the seal openings, before the plug seal moves out of face to face sealing engagement with the receptacle seal.

The optical feed through connector in the embodiment described above and illustrated in FIGS. 1 to 21 is capable of subsea, wet-mate connection including subsea, down-hole environments, as well as connection in other harsh environments. This connector design allows placement of one to six or more optical circuits in an overall package of relatively small diameter. In one example, a 1-6 way optical circuit connector may be around 1.25 inches in diameter. The optical contacts inside the plug and receptacle units, and the corresponding passageways leading through the end seals and contact chamber inlets, are arranged in a circular pattern with an offset of sixty degrees between each adjacent pair of contacts/optical circuits and the corresponding passageways. The rotating seals are arranged to rotate axially around the connectors when actuated, exposing the faces of the optical ferrules and allowing the optical stems of the receptacle unit to pass through the aligned seal openings and into the plug contact chamber, permitting contact between the opposing optical end faces or contact faces for optical signal communication between the units.

In the above embodiments, the end seals of the plug and receptacle units are pressed into face to face sealing engagement at the start of mating, while the receptacle end seal is arranged to rotate relative to the plug end seal, and the rotation of the front curved annular face relative to the opposing curved annular face tends to sweep debris away from the seal faces. Additionally, the receptacle chamber inlets remain closed and sealed initially, and the receptacle and plug seals start to open sequentially rather than simultaneously. This is due to the design of the cam slots in the receptacle shell which are configured to rotate the receptacle seal rotator and receptacle seal in unison initially, before the receptacle seal is rotated relative to the seal rotator so that the seal openings align with the seal rotator passageways or contact chamber inlets. The same cam slots actuate the receptacle and plug seals, with the plug seal rotated into the fully open position after the receptacle seal openings are aligned with the receptacle contact chamber inlets or passageways. This further reduces the risk of sea water entering the contact chambers. Another advantage of the sealing mechanism of the above embodiments is the two stage seal, with the seal openings being squeezed shut by the actuator in addition to being offset from the contact chamber inlet in the unactuated condition of the unit.

Figure 23:
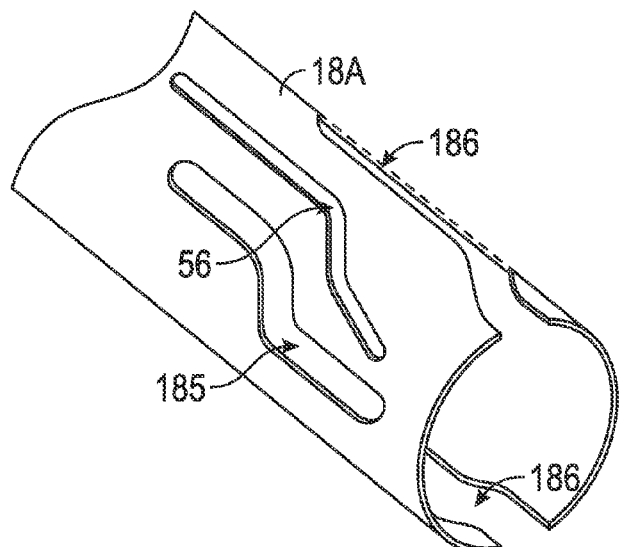
FIG. 23 is a perspective view similar to that of FIG. 8 but illustrating a modified outer shell of a second embodiment of the connector, in which separate cam grooves are provided for receiving respective receptacle and plug cam lugs.
Figure 24:
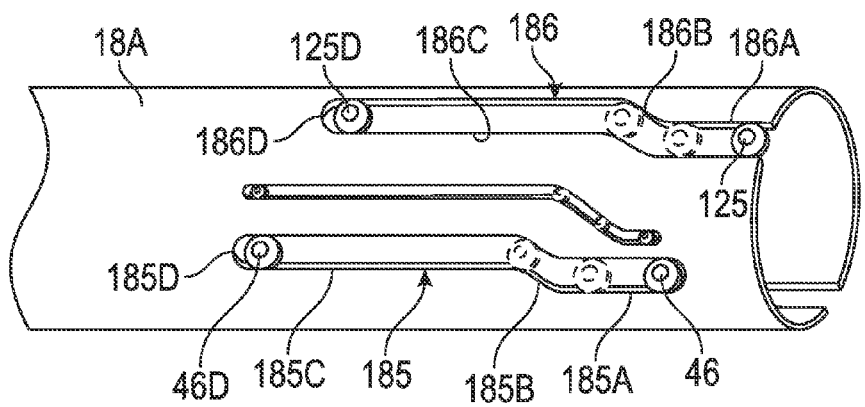
FIG. 24 is a side elevation view of the outer shell of FIG. 23, illustrating positions of the plug and receptacle cam lugs at various points during mating and de-mating of the connector units.

FIGS. 23 and 24 illustrate a modification of the above embodiments in which the cam formations in the shell of the first connector unit or receptacle unit of the previous embodiments are modified to allow for simultaneous opening of the plug and receptacle units. The connector of this embodiment is otherwise identical to the connector described above and is therefore not described again here. As shown in FIGS. 4 and 8, in the shell 18 of the connector unit 14 of the first embodiment, the same cam grooves or slots 55 receive both the cam lugs 46 of the receptacle seal assembly and the cam lugs 125 of the plug seal assembly. In the modified embodiment of FIGS. 23 and 24, modified connector shell 18A has separate cam grooves or slots 185, 186 for receiving the cam lugs 46 of the receptacle seal assembly and the cam lugs 125 of the plug seal assembly, respectively.

Cam slots 186 are aligned with slots 110 at the forward end of the plug shell (FIG. 1) as the units are brought into mating engagement, and cam lugs 125 move from slots 110 into slots 186 during mating (and back out of slots 186 into slots 110 when the units are separated). Cam slots 185 and 186 are of similar shape with matching first straight portions (185A, 186A), inclined portions (185B, 186B), and second straight portions (185C, 186B). Receptacle and plug cam lugs 46, 125 are shown in solid outline at the start of each of the first straight portion 185A, 185B in FIG. 24, at a first stage of mating engagement between the connector units when opposing rotating seals are urged into face to face sealing engagement. As mating continues, the lugs move through the straight portions and into the inclined portions 185B and 186B, as indicated in dotted outline. The seals are rotated simultaneously into open positions as the lugs travel along the respective inclined portions. When the lugs are located at the inner or rear ends 185D, 186D of the cam slots (positions 46D and 125D, respectively), the connector units are fully mated as illustrated in FIGS. 20 and 21 for the first embodiment. In this embodiment, the plug cam lugs 125 are accepted in the cam grooves 186 and rotated independently from the receptacle cam lugs 46 which are captive in the closed cam grooves 185. This allows simultaneous opening (and closing) of both the plug and receptacle seals on mating (and de-mating).

Although an optical fiber connector is described in the above embodiments, other embodiments may comprise electrical connectors with electrical contacts and circuits in place of the optical contacts and circuits, or hybrid electro-optic connectors with both fiber optic and electrical contacts.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:
1. A harsh environment connector, comprising:
a receptacle unit having a receptacle shell having a front end, a rear end, and a longitudinal axis, at least one receptacle contact chamber within the receptacle shell and at least one receptacle contact stem extending forwardly into the contact chamber with a contact at its front end, a front end wall of the contact chamber having at least one inlet passageway, and a receptacle seal device rotatably mounted adjacent the front end wall for rotation about the longitudinal axis of the shell, the seal device having at least one opening;
a plug unit configured for releasable mating engagement with the receptacle unit in a mated condition of the units, the plug unit having a plug shell having front end, a rear end, and a longitudinal axis, at least one plug contact chamber within the plug shell and at least one plug contact stem extending forwardly into the plug contact chamber and having a contact at its front end, a front end wall of the plug contact chamber having one or more inlet passageways, and a plug seal device rotatably mounted adjacent the front end wall of the plug contact chamber for rotation about the longitudinal axis of the plug shell and having at least one opening;
the inlet passageways of the front end walls of the contact chambers being aligned with the respective contact stems at least in the mated condition of the plug and receptacle units, the openings in the respective seal devices being offset from the inlet passageways of the respective end walls in the unmated condition of the units to seal the passageways and being aligned with the respective inlet passageways in the mated condition of the units;
an actuator mechanism in one of the units which actuates the seal devices of both units during mating engagement to rotate the seal openings into alignment with the respective contact chamber inlet passageways and contacts, whereby the contact of one of the receptacle and plug units extends through the aligned openings into contact with the contact of the other one of the receptacle and plug units, and actuates the seal devices of both units during de-mating of the units to rotate the seal openings out of alignment with the respective contact chamber inlet passageways;

wherein the actuator mechanism comprises one or more cam grooves or slots in the receptacle shell and the seal devices of the plug and receptacle units have radially projecting cam lugs which engage and travel along the one or more cam grooves or slots during mating and de-mating of the units, each cam groove or slot being angled along at least part of the length of the cam groove or slot to control rotation of the respective seal devices between a sealed and closed condition and an open condition.

2. The connector of claim 1, wherein the receptacle unit has a receptacle manifold enclosing at least part of the receptacle contact chamber and movably mounted in the receptacle shell for movement between an extended position when the units are unmated and a retracted position in the receptacle shell when the units are mated, and a biasing device which urges the manifold and seal device back to the extended position during de-mating, the one or more cam grooves or slots extending rearward from the front end of the receptacle shell and having at least one angled portion configured for rotating the seal devices of the receptacle and plug units when the respective cam lug travels along the angled portion.

3. The connector of claim 1, wherein the plug unit has a plug manifold located inside the plug shell at least in the unmated condition of the units and enclosing at least part of the plug contact chamber, the plug shell being movable relative to the plug manifold and associated plug seal device between an extended position extending over the plug manifold and seal device when the units are unmated and a retracted position in which the plug manifold and associated seal device extend out of the front end of the plug shell and into the receptacle shell when the units are mated, whereby the respective cam lug of the plug seal device engages a respective cam groove or slot of the receptacle shell during mating and de-mating such that the plug seal device is moved between the closed and open condition.

4. The connector of claim 1, wherein each seal device comprise a seal formed at least substantially of elastomeric material and having a central through bore, an annular seal portion surrounding the through bore and having an annular front end face, the annular seal portion having at least one seal opening extending through the annular seal portion up to the annular front end face.

5. The connector of claim 4, wherein the receptacle and plug contact chambers each have a plurality of contacts arranged at spaced intervals in a ring around the central longitudinal axis of the respective receptacle and plug units, the front end wall of each contact chamber has a corresponding number of inlet passageways arranged in a ring for alignment with the respective contacts, and the annular seal portion of each seal has a corresponding number of seal openings arranged at spaced intervals for alignment with the respective inlet passageways and contacts in the sealed and open condition of the seal device, the seal openings having front end portions extending up to the respective annular front end faces of the seals.

6. The connector of claim 5, wherein the annular front end face of each seal is configured for sealing engagement with the annular front end face of the other seal in the mated condition of the units.

7. The connector of claim 6, wherein the annular front end face of each seal is of arcuate cross-sectional shape.

8. The connector of claim 6, wherein each of the receptacle and plug units further comprise a seal clamp member extending into the central through bore of the respective seal, each seal and seal clamp member being relatively rotatable between a closed and sealed condition when the receptacle and plug units are unmated and an open position when the receptacle and plug units are in mating engagement, wherein each seal opening is offset from the inlet passageway in the respective front end wall and clamped shut by the seal clamp member in the sealed and closed condition, and is aligned with the inlet passageway and not clamped shut by the seal clamp member in the sealed and open condition.

9. The connector of claim 8, wherein each seal clamp member has a stem of reduced diameter extending into the seal through bore and a front end portion of larger cross sectional dimensions than the stem having a peripheral rim with alternating lobes and indents equal in number to the number of seal openings, the lobes being aligned with front end portions of the respective seal openings and configured to squeeze the front end portions of the respective seal openings closed in the unmated condition of each seal, and being offset from the respective seal openings in the mated condition, whereby the seal openings are opened by contacts of at least one of the plug and receptacle units extending through the aligned seal openings of the seals on mating of the units.

10. The connector of claim 9, wherein the front end portion of each seal opening is of slit-like shape and the lobes of the front end portion of each clamp member are of shape substantially matching the slit-like shape of the front end portion of each seal opening.

11. The connector of claim 10, wherein at least the front end portion of each seal opening is of arcuate slit shape.

12. A harsh environment connector, comprising:
first and second releasably mateable connector units each having a rear end, a front end, and a central longitudinal axis;
each connector unit having at least one contact chamber having a front end wall with at least one inlet passageway communicating with the contact chamber, at least one contact stem extending forward into the contact chamber and having a contact at its front end located in the contact chamber and aligned with the inlet passageway at least in the mated condition of the connector unit, and a seal assembly adjacent to the front end wall of the contact chamber movable between a sealed and closed condition sealing said inlet passageway when the connector units are unmated and an open condition when the connector units are mated to allow the contact of one of the connector units to move into engagement with the aligned contact of the other connector unit;
each seal assembly comprising a seal formed at least substantially of elastomeric material and having a central through bore and an annular seal portion surrounding the through bore, the annular seal portion having at least one seal opening, and a seal clamp member engaged in the central through bore;
each seal and seal clamp member being relatively rotatable about the central longitudinal axis of the respective connector unit between a closed and sealed condition when the connector units are unmated and a sealed and open position when the connector units are in mating engagement; and
a seal actuator mechanism configured for actuating each seal assembly for movement back and forth between the closed and open conditions during mating and de-mating of the connector units;
wherein each seal opening is offset from the inlet passageway and clamped shut by the seal clamp member in the sealed and closed condition, and is aligned with the inlet passageway and not clamped shut by the seal clamp member in the sealed and open condition; and the seal openings of the elastomeric seals are aligned in the sealed and open condition;

wherein the seal actuator mechanism comprises at least one cam lug projecting radially outwardly from at least one of the seal and seal clamp member of each seal assembly and at least one first lug receiving groove or slot on the first connector unit which is configured to receive and guide the radial outer ends of both cam lugs during mating and de-mating to move the respective seals back and forth between the closed and open positions.

13. The connector of claim 12, wherein the seal actuating mechanism further comprises at least one second lug receiving groove or slot on the second connector unit which is configured to receive and guide the radial outer ends of the at least one cam lug of the seal assembly of the second connector unit in the unmated condition, whereby the cam lug moves from the second lug receiving groove or slot into the first lug receiving groove or slot during mating of the connector units.

14. The assembly of claim 12, wherein the seal actuator mechanism is configured to actuate the seal assemblies of the first and second connector units to move simultaneously into the open position on mating and the closed position on de-mating.

15. The connector of claim 12, further comprising a secondary seal actuator mechanism in one of the units configured to rotate one of the seals relative to the other seal during mating and de-mating of the units, the second seal actuator mechanism comprising at least one second seal groove or slot in said connector unit and at least one second cam lug extending radially from said one seal into the second seal groove, and the second seal groove being configured to rotate said one seal relative to the other seal during mating of the units.

16. The connector of claim 12, wherein the annular elastomeric seal portions of the seals have opposing front faces configured for face to face sealing engagement during mating of the connectors.

17. The connector of claim 16, wherein opposing front faces of the annular seal portions are of convex cross sectional shape.

18. The connector of claim 16, wherein the front face of the annular seal portion of one of the seals is of convex cross sectional shape and the opposing front face of the annular seal portion of the other seal is of matching concave cross sectional shape.

19. The connector of claim 16, further comprising a secondary seal actuator mechanism in one of the units configured to rotate one of the elastomeric seals relative to the other elastomeric seal when the convex front faces first move into contact during mating engagement of the units.

20. The connector of claim 12, wherein each contact chamber has a plurality of contacts arranged at spaced intervals in a ring around the central longitudinal axis of the connector unit, the front end wall of each contact chamber has a corresponding number of inlet passageways arranged in a ring for alignment with the respective contacts, and the annular seal portion of each seal has a corresponding number of seal openings arranged at spaced intervals for alignment with the respective inlet passageways in the sealed and open condition of the seal assembly, the seal openings having front end portions extending up to annular front faces of the seals.

21. The connector of claim 20, wherein each seal clamp has a front end portion having a peripheral edge having alternating lobes and indents, the number of lobes being equal to the number of seal openings, the lobes being aligned with front end portions of the of the respective seal openings in the unmated condition and offset from seal openings in the mated condition, and the lobes deforming the elastomeric material of the seal at the front end of the respective seal opening squeeze the seal openings into a sealed shut condition.

22. The connector of claim 21, wherein at least a front end portion of each seal opening is of slit-like shape substantially matching the shape of the outer end of the respective lobe, each slit-shaped front end portion being squeezed shut by the respective lobe in the unmated condition of the units and being released in the mated condition when the respective lobe is offset from the slit shaped front end portion to allow the slit-shaped front end portions to be forced into an open condition by the contacts and contact stems extending through the seal openings during mating.

23. The connector of claim 12, wherein the first connector unit has a first shell having a front end, a manifold enclosing at least part of the contact chamber and movably mounted in the first shell for movement between an extended position when the connector units are unmated and a retracted position in the first shell when the connector units are mated, the seal assembly of the first connector unit located at a front end of the manifold, and a biasing device which urges the manifold and seal assembly back to the extended position during de-mating, the lug receiving groove or slot extending rearward from the front end of the first shell and having at least one angled portion configured for rotating the seal or seal clamp member of each seal assembly when the respective cam lug travels along the angled portion.

24. The connector of claim 23, wherein the second connector unit has a second shell having a front end, a second manifold located inside the second shell at least in the unmated condition of the units and enclosing at least part of the contact chamber, the seal assembly of the second connector unit being associated with the front end of the second manifold, the second shell being movable relative to the second manifold and associated seal assembly between an extended position extending over the second manifold and associated seal assembly when the units are unmated and a retracted position in which the second shell and associated seal assembly extend out of the front end of the second shell and into the first manifold when the units are mated, whereby the cam lug of the seal assembly associated with the second manifold engages the lug receiving groove or slot of the first connector unit during mating and de-mating such that the seal assembly associated with the second manifold is moved between the closed and open condition.

25. The connector of claim 12, wherein the first connector unit has a first shell having a front end, the seal actuator mechanism comprises three equally spaced cam lugs projecting radially outwardly from at least one of the seal and seal clamp member of each seal assembly, and the first shell has three first lug receiving grooves or slots which are configured to receive and guide the radial outer ends of the respective cam lugs during mating and de-mating to move the respective seals back and forth between the closed and open positions.

26. The connector of claim 25, wherein the second connector unit has a second shell having a front end, the second shell having three second spaced lug receiving grooves or slots extending in a direction parallel to the central longitudinal axis of the second connector unit up to the front end of the second shell and the radial cam lugs of the seal assembly of the second connector unit extend into the respective second lug receiving grooves or slots of the second connector unit in the unmated condition and extend into the lug receiving grooves or slots of the first connector unit during mating.

27. The connector of claim 12, wherein each connector unit has multiple spaced contact stems extending into the respective contact chamber and terminating in contacts arranged at spaced intervals around a circle and the front end wall has a corresponding number of inlet passageways, and each seal has a plurality of seal openings at spaced intervals around the annular portion corresponding in number to the number of contacts.

28. The connector of claim 27, wherein each seal has an annular front end face configured for sealing engagement with the annular front end face of the other seal in the mated condition of the units and each seal clamp has a stem of reduced diameter engaging in the respective seal through bore and a front end portion of larger diameter having a peripheral rim with alternating lobes and indents equal in number to the number of seal openings, the lobes being aligned with the respective seal openings and configured to squeeze the seal openings into a closed and sealed shut condition in the unmated condition of the respective connector unit, and being offset from the respective seal openings in the mated condition whereby the seal openings are opened by contacts of one unit extending through the aligned seal openings of the seals on mating of the connector units.

29. The connector of claim 28, wherein each seal has multiple seal openings of arcuate slit shape.

30. The connector of claim 29, wherein the lobes of the seal clamp are of shape substantially matching the shape of the seal openings.

31. A harsh environment connector, comprising:
first and second releasably mateable connector units each having a rear end, a front end, and a central longitudinal axis;
each connector unit having a shell, at least one contact chamber inside the shell having a front end portion with at least one inlet passageway communicating with the contact chamber, at least one contact stem extending forward into the contact chamber and having a contact at its front end located in the contact chamber and aligned with the inlet passageway at least in a mated condition of the connector units, a first seal assembly adjacent the front end wall of the contact chamber of the first connector unit and a second seal assembly adjacent the front end portion of the contact chamber of the second connector unit, the first and second seal assemblies each being movable between a sealed and closed condition sealing the respective inlet passageway when the connector units are unmated and an open condition when the connector units are mated to allow the contact of at least one connector unit to extend through the seal assemblies into engagement with the contact of the other connector unit;
the first and second seal assemblies each comprising at least one seal member rotatable about the central longitudinal axis of the respective connector unit and having at least one seal opening which is radially spaced from the longitudinal axis and is offset from the inlet passageway of the respective contact chamber in the sealed and closed condition and aligned with the inlet passageway of the respective contact chamber in the open condition; and
an actuator mechanism configured to move the first and second seal members back and forth between the sealed and closed condition and the open condition on mating and de-mating of the connector units, the actuator mechanism comprising at least one radially projecting cam lug associated with each seal assembly, and one or more cam grooves or slots in the shell of the first connector unit configured to receive the cam lugs associated with both seal assemblies during mating and de-mating to rotate the seal members between the closed and open positions.

32. The connector of claim 31, wherein each seal member is formed at least partially of elastomeric material, and is of annular shape with a central opening and an annular front face configured for sealing engagement with the opposing annular front face of the other seal member during mating engagement of the connector units.

33. The connector of claim 32, wherein each seal member has a plurality of seal openings extending at spaced intervals around the annular front face, and each contact chamber has a corresponding number of contacts configured for alignment with the respective seal openings in the mated condition of the units.

34. The connector of claim 33, wherein each seal assembly further comprises a rigid clamp member engaged in the central opening of the respective seal member, the seal and clamp members being relatively rotatable between a closed and sealed condition in which the seal openings are clamped shut by the clamp member when the connector units are unmated and a sealed and open position in which the seal openings are released when the connector units are in mating engagement.

35. The connector of claim 34, wherein the clamp members of the first and second seal assemblies extend from the front end portions of the contact chambers of the respective connector units into the respective seal members.

36. The connector of claim 35, wherein the first and second connector units have respective first and second manifolds containing the contact chambers and having front ends, the front end portion of the contact chamber of the second connector unit is formed integrally with the second manifold, and the radially projecting cam lug projects from the seal member of said second seal assembly.

37. The connector of claim 36, wherein the front end portion of the contact chamber of the first connector unit is rotatably mounted over the front end of the first manifold, and at least one radially projecting cam lug projects from the rotatably mounted front end portion of the contact chamber for engagement in a respective primary cam groove or slot.

38. The connector of claim 37, wherein the seal member of the first seal assembly is rotatably mounted over the clamp member and has at least one radially outwardly projecting secondary cam lug, and at least one secondary cam groove or slot in the shell of the first connector unit is configured to receive the secondary cam lug to rotate the seal member relative to the clamp member of the first seal assembly for a predetermined first portion of the mating of the connector units and a predetermined second portion of the de-mating of the connector units.

39. The connector of claim 38, wherein the primary and secondary cam grooves or slots are configured to rotate the seal member and the rotatable front end portion of the contact chamber and the associated clamp member of the first connector unit in unison for a second portion of the mating engagement of the connector units and a first portion of the de-mating of the connector units.

* * * * *